(12) United States Patent
Wang et al.

(10) Patent No.: US 12,554,409 B2
(45) Date of Patent: Feb. 17, 2026

(54) MEMORY DEVICE, MEMORY SYTEM, AND OPERATION METHOD THEREOF FOR APPLYING READ VOLTAGES TO WORD LINE

(71) Applicant: YANGTZE MEMORY TECHNOLOGIES CO., LTD., Wuhan (CN)

(72) Inventors: Tingze Wang, Wuhan (CN); Ying Huang, Wuhan (CN); HongTao Liu, Wuhan (CN); Lei Guan, Wuhan (CN); Yuanyuan Min, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/781,711

(22) Filed: Jul. 23, 2024

(65) Prior Publication Data

US 2025/0348220 A1    Nov. 13, 2025

(30) Foreign Application Priority Data

May 9, 2024    (CN) .......................... 202410572843.2

(51) Int. Cl.
  *G06F 3/06* (2006.01)

(52) U.S. Cl.
  CPC .......... *G06F 3/0613* (2013.01); *G06F 3/0659* (2013.01); *G06F 3/0679* (2013.01)

(58) Field of Classification Search
  CPC ..... G06F 3/0613; G06F 3/0679; G06F 3/0659
  See application file for complete search history.

(56) References Cited

U.S. PATENT DOCUMENTS

| | | | |
|---|---|---|---|
| 11,024,393 B1 * | 6/2021 | Zhang | G11C 16/0483 |
| 2012/0257455 A1 * | 10/2012 | Oh | G11C 16/0483 365/185.18 |
| 2019/0311772 A1 * | 10/2019 | Diep | G11C 16/08 |
| 2021/0012841 A1 * | 1/2021 | Yanagidaira | H10B 43/27 |
| 2021/0065819 A1 * | 3/2021 | Choi | G11C 29/42 |
| 2023/0152982 A1 * | 5/2023 | Ham | G06F 3/0679 711/154 |

* cited by examiner

*Primary Examiner* — Mark A Giardino, Jr.
(74) *Attorney, Agent, or Firm* — Conley Rose, P.C.

(57) ABSTRACT

The present disclosure provides a memory device, operation method thereof, memory system and operation method thereof. The memory device includes a peripheral circuit and a memory cell array coupled with the peripheral circuit. The memory cell array includes groups of memory cells, and one group of memory cells is correspondingly coupled with one word line. The peripheral circuit is configured to: apply a first read voltage to a selected word line in a first duration, to perform a read operation on a first page of memory cells to be read; and apply a second read voltage to the selected word line in a second duration, to perform a read operation on a second page of the memory cells to be read. A relationship of length between the first duration and the second duration is related to a relationship of magnitude between a first voltage difference and a second voltage difference.

20 Claims, 14 Drawing Sheets

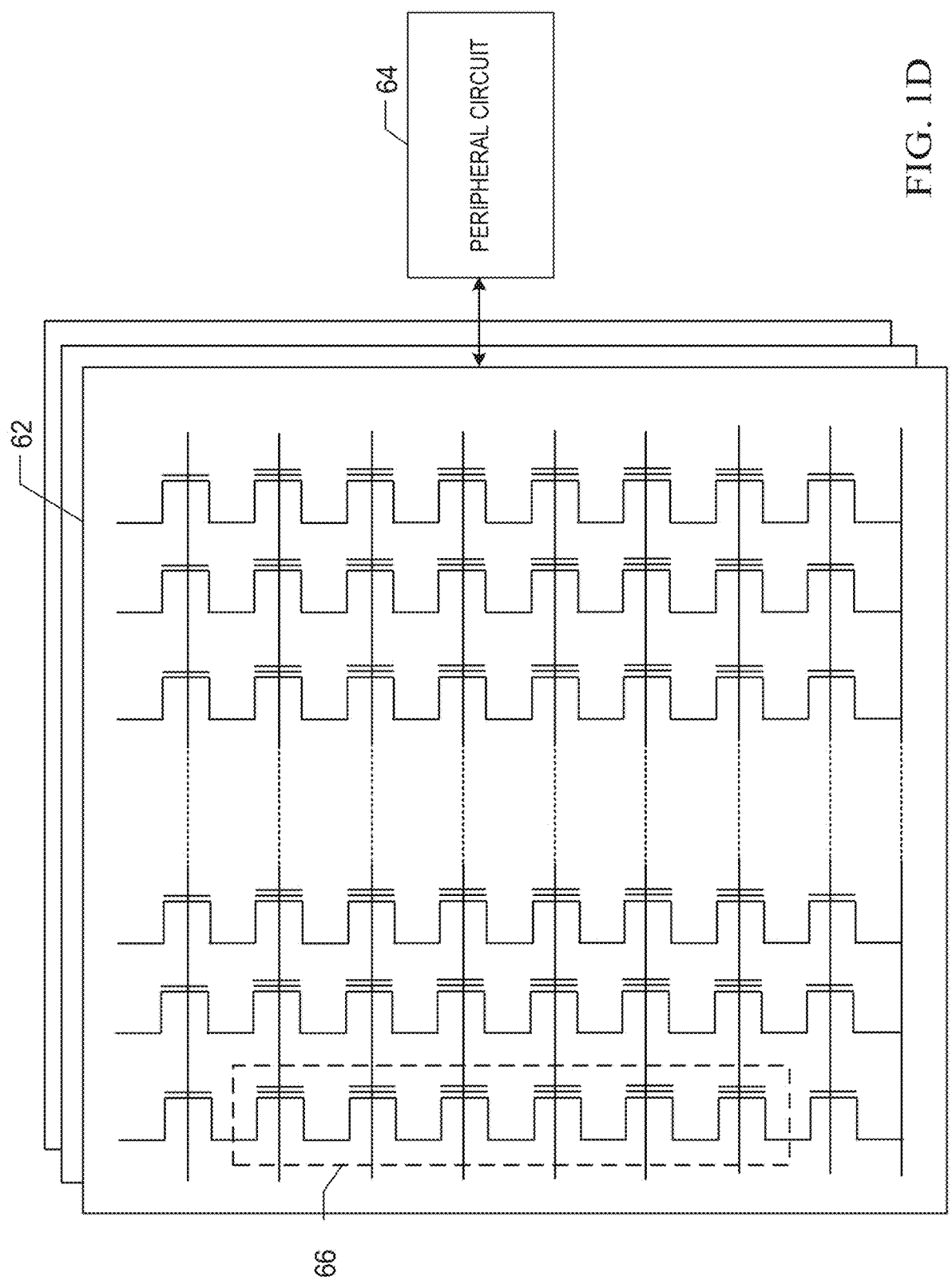

| LP | 1 | 1 | 1 | 0 | 0 | 0 | 0 | 1 | 1 | 1 | 1 | 0 | 0 | 0 | 0 | 0 |
|---|---|---|---|---|---|---|---|---|---|---|---|---|---|---|---|---|
| MP | 1 | 0 | 0 | 0 | 0 | 0 | 1 | 1 | 1 | 0 | 0 | 0 | 1 | 1 | 1 | 1 |
| UP | 1 | 1 | 0 | 0 | 0 | 0 | 0 | 0 | 1 | 1 | 1 | 1 | 1 | 0 | 0 | 1 |
| XP | 1 | 1 | 1 | 1 | 0 | 0 | 1 | 1 | 0 | 0 | 0 | 0 | 0 | 0 | 1 | 1 |
| STATE | 0 | 1 | 2 | 3 | 4 | 5 | 6 | 7 | 8 | 9 | 10 | 11 | 12 | 13 | 14 | 15 |

GRAY CODE LOOKUP TABLE CORRESPONDING TO QLC

FIG. 2

| LP | Vrd2 (-1.6V) | Vrd5 (-0.4V) | Vrd11 (2V) | |
|---|---|---|---|---|
| MP | Vrd1 (-2V) | Vrd7 (0.4V) | Vrd10 (1.6V) | Vrd12 (2.4V) |
| UP | Vrd3 (-1.2V) | Vrd9 (1.2V) | Vrd13 (2.8V) | Vrd15 (3.6V) |
| XP | Vrd4 (-0.8V) | Vrd6 (0V) | Vrd8 (0.8V) | Vrd14 (3.2V) |

FIG. 3B

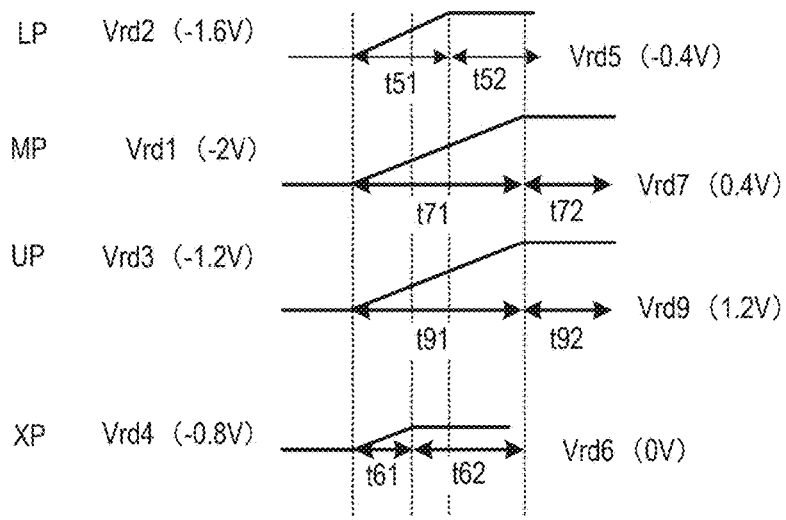
FIG. 10
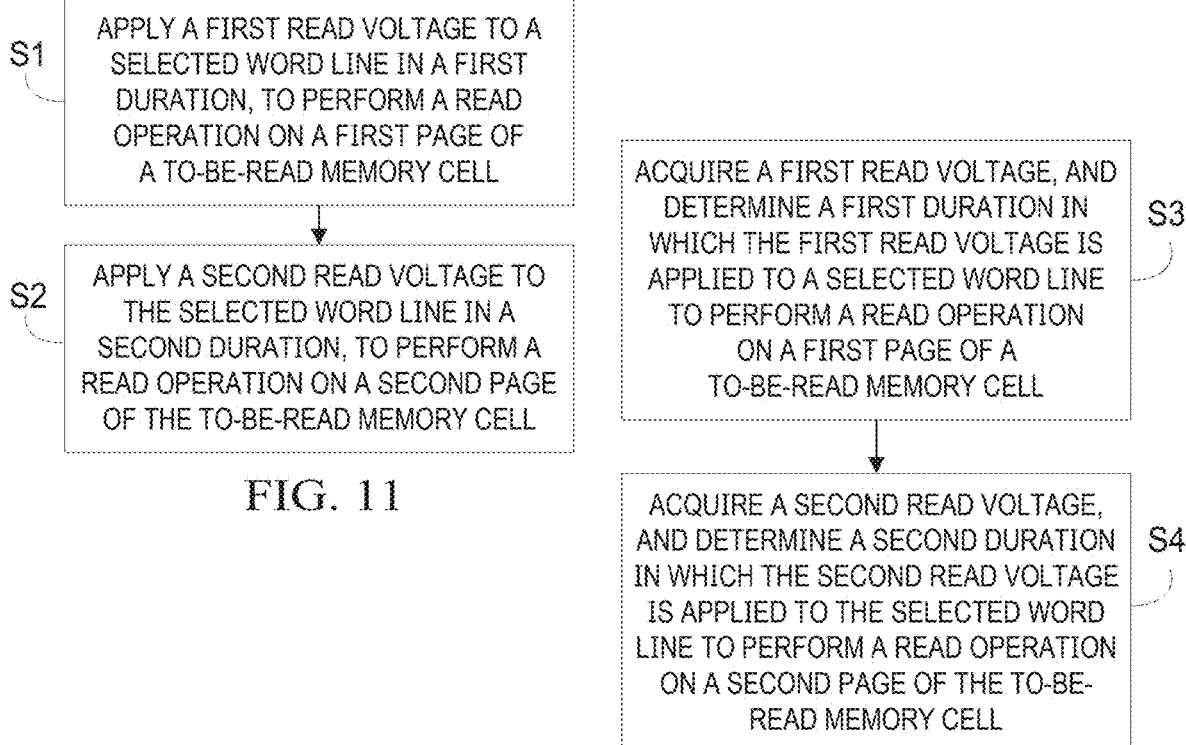
FIG. 11
FIG. 12

MEMORY DEVICE, MEMORY SYTEM, AND OPERATION METHOD THEREOF FOR APPLYING READ VOLTAGES TO WORD LINE

CROSS-REFERENCE TO RELATED APPLICATIONS

The present application claims priority to Chinese Patent Application No. 2024105728432, which was filed May 9, 2024, is titled "MEMORY DEVICE AND ITS OPERATING METHOD, MEMORY SYSTEM AND ITS OPERATING METHOD," and is hereby incorporated herein by reference in its entirety.

TECHNICAL FIELD

Examples of the present disclosure relate to the semiconductor technology, and relate to, but are not limited to, a memory device and an operation method thereof, and a memory system and an operation method thereof.

BACKGROUND

Semiconductor memories may be roughly divided into two types, depending on whether they retain stored data in case of power failure. Such two types of semiconductor memories are volatile memories and non-volatile memories. The volatile memories lose the stored data in case of power failure, and the non-volatile memories retain the stored data in case of power failure. Memory cells in the non-volatile memories are connected to bit lines and word lines respectively, and thus have good random access characteristics.

SUMMARY

In view of this, examples of the present disclosure provide a memory device and an operation method thereof, and a memory system and an operation method thereof.

In a first aspect, examples of the present disclosure provide a memory device that comprises a peripheral circuit and a memory cell array coupled with the peripheral circuit, wherein the memory cell array comprises a plurality of groups of memory cells, and one of the plurality of groups of memory cells is correspondingly coupled with one word line; and the peripheral circuit is configured to: apply a first read voltage to a selected word line in a first duration, to perform a read operation on a first page of memory cells to be read; and apply a second read voltage to the selected word line in a second duration, to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In a second aspect, examples of the present disclosure further provide a memory system that comprises a memory device and a memory controller coupled with the memory device, wherein the memory device comprises a memory cell array; the memory cell array comprises a plurality of groups of memory cells, and one of the plurality of groups of memory cells is correspondingly coupled with one word line; and the memory controller is configured to: acquire a first read voltage, and determine a first duration in which the first read voltage is applied to a selected word line to perform a read operation on a first page of memory cells to be read; and acquire a second read voltage, and determine a second duration in which the second read voltage is applied to the selected word line to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In a third aspect, examples of the present disclosure further provide an operation method for a memory device. The method comprises: applying a first read voltage to a selected word line in a first duration, to perform a read operation on a first page of memory cells to be read; and applying a second read voltage to the selected word line in a second duration, to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In a fourth aspect, examples of the present disclosure further provide an operation method of a memory system. The method comprises: acquiring a first read voltage, and determining a first duration in which the first read voltage is applied to a selected word line to perform a read operation on a first page of memory cells to be read; and acquiring a second read voltage, and determining a second duration in which the second read voltage is applied to the selected word line to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In the examples of the present disclosure, the length of each read duration is not a fixed value, but is determined according to the voltage difference (e.g., the absolute value of the difference between the read voltage and the initial voltage in the duration). As such, a duration corresponding to each read voltage may be precisely determined. The first read voltage is applied to the selected word line in the first duration, to perform a read operation on the first page of the memory cells to be read. The second read voltage is applied to the selected word line in a second duration, to perform a read operation on the second page of the memory cells to be read. Therefore, the duration corresponding to each read voltage has varied length. The read duration of the memory cells to be read is equal to a sum of read durations of all pages of the memory cells to be read. It may be understood that, in the examples of the present disclosure, a duration of a corresponding read voltage may be determined according to the voltage difference between the read voltage and the initial voltage. Therefore, the durations of at least some of the read voltages applied on the selected word line are shortened, such that an overall read duration of the memory cells to be read is shortened, and read performance of the NAND flash memory cell is effectively improved.

BRIEF DESCRIPTION OF THE DRAWINGS

In the drawings, like reference numerals may denote like components in different views. Like reference numerals having different letter suffixes may represent different examples of like components. The drawings generally illustrate the various examples discussed herein by way of example rather than limitation.

FIGS. 1D and 1E are schematic structural diagrams of a memory comprising a memory cell array and a peripheral circuit provided by an example of the present disclosure.

FIG. 2 is a Gray Code lookup table corresponding to a QLC NAND flash memory provided by examples of the present disclosure.

FIG. 3B illustrates example values of read voltages corresponding to pages provided by examples of the present disclosure.

FIG. 10 is a schematic diagram of a waveform varying from an initial voltage to a read voltage corresponding to an $N^{th}$ read step of each page provided by examples of the present disclosure.

FIG. 11 is a flow diagram I of an operation method provided by examples of the present disclosure.

FIG. 12 is a flow diagram II of an operation method provided by examples of the present disclosure.

DETAILED DESCRIPTION

Figure 1A:
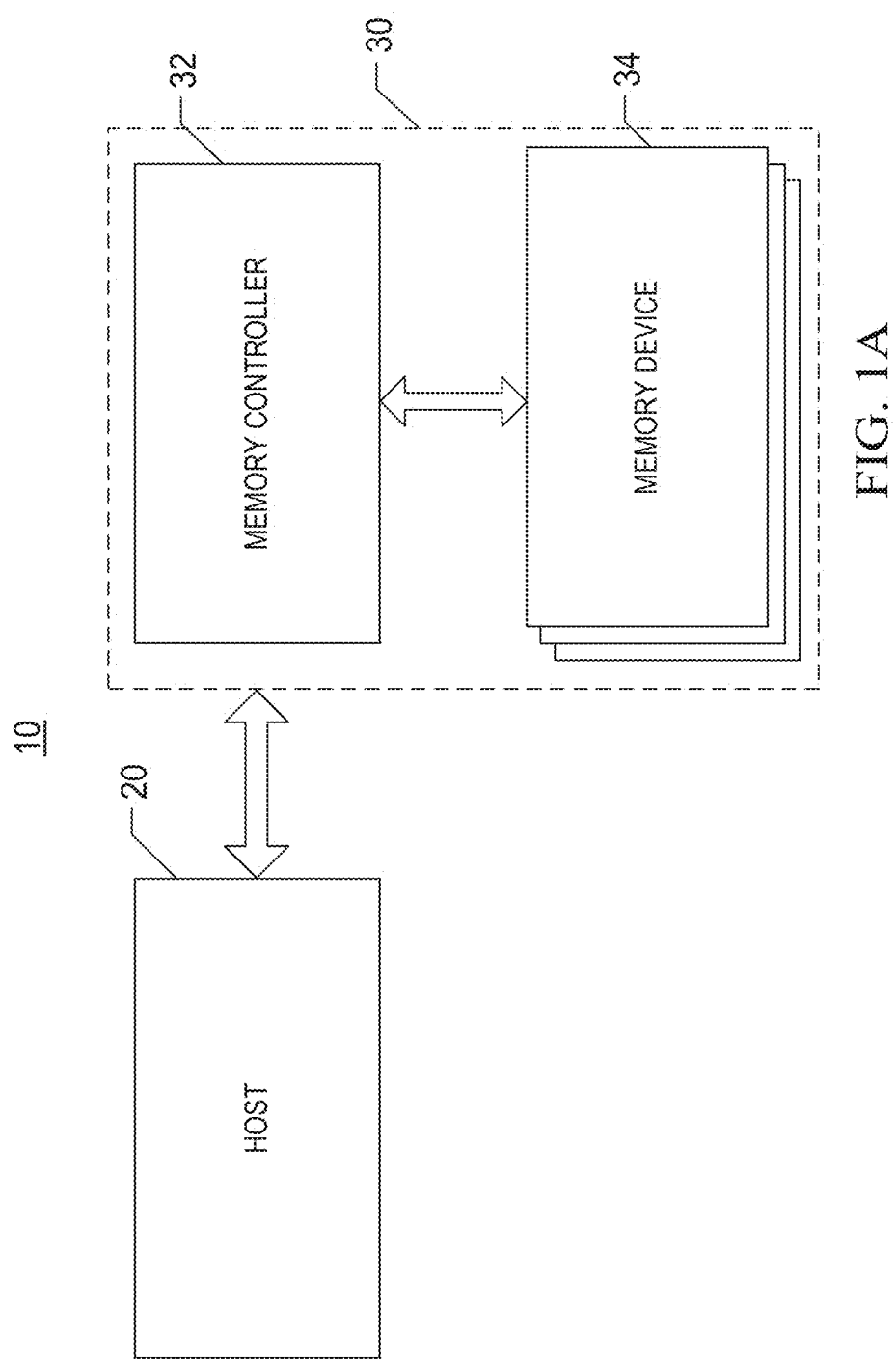
FIG. 1A is a schematic structural diagram of an example system provided by an example of the present disclosure.

For ease of understanding the present disclosure, the present disclosure will be described in detail below with reference to the related drawings. Examples of the present disclosure are given in the drawings. However, the present disclosure may be implemented in many different forms, and is not limited to the examples described herein. Instead, these examples are provided for a more thorough and comprehensive understanding of the disclosure of the present disclosure.

Unless defined otherwise, all technical and scientific terms used herein have the same meanings as those generally understood by those skilled in the art of the present disclosure. The terms used in the specification of the present disclosure are only for the purpose of describing specific examples, and are not intended to limit the present disclosure. The term "and/or" used herein includes any or all combinations of one or more listed associated items.

As shown in FIG. 1A, examples of the present disclosure illustrate an example system 10. The example system 10 may comprise a host 20 and a memory system 30. The example system 10 may include, but is not limited to, a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memory devices 34 therein. The host 20 may be a processor (e.g., a central processing unit (CPU)) of an electronic apparatus, or a system on chip (SoC) (e.g., an application processor (AP)).

In an example of the present disclosure, the host 20 may be configured to send or receive data to or from the memory system 30. Here, the memory system 30 may comprise a memory controller 32 and one or more memory devices 34. The memory device 34 may include, but is not limited to, a NAND flash memory, a vertical NAND flash memory, a NOR flash memory, a Dynamic Random Access Memory (DRAM), a Ferroelectric Random Access Memory (FRAM), a Magnetoresistive Random Access Memory (MRAM), a Phase Change Random Access Memory (PCRAM), a Resistive Random Access Memory (RRAM), a Nano Random Access Memory (NRAM), etc.

In an example of the present disclosure, the memory controller 32 may be coupled to the memory device 34 and the host 20, and is configured to control the memory device 34. In an example, the memory controller 32 may be designed for operating in a low duty-cycle environment, such as a Secure Digital (SD) card, a Compact Flash (CF) card, a Universal Serial Bus (USB) flash drive, or other media for use in electronic apparatuses, such as a personal computer, a digital camera, a mobile phone, etc. In some examples, the memory controller 32 may be further designed for operating in a high duty-cycle environment, such as an SSD or an embedded Multi-Media Card (eMMC) used as data memories for mobile apparatuses, such as a smartphone, a tablet computer, a laptop computer, etc., and an enterprise memory array.

Further, the memory controller 32 may manage data in the memory device 34, and communicate with the host. The memory controller 32 may be configured to control read, erase and program operations, etc. of the memory device 34, may be further configured to manage various functions with respect to data stored or to be stored in the memory device 34, including, but not limited to, bad-block management, garbage collection, logical-to-physical address conversion, wear leveling, etc., and may be further configured to process error checking and correction (ECC) with respect to the data read from or written to the memory device 34. Furthermore, the memory controller 32 may perform any other suitable functions as well, e.g., formatting the memory device 34 or communicating with an external apparatus (e.g., the host 20 in FIG. 1A) according to a particular communication protocol. In an example, the memory controller 32 may communicate with the external host through at least one of various interface protocols, e.g., a USB protocol, an MMC protocol, a Peripheral Component Interconnect (PCI) protocol, a Peripheral Component Interconnect Express (PCI-E) protocol, an Advanced Technology Attachment (ATA) protocol, a serial-ATA protocol, a parallel-ATA protocol, a Small Computer System Interface (SCSI) protocol, an Enhanced Small Disk Interface (ESDI) protocol, an Integrated Drive Electronics (IDE) protocol, a fire wire protocol, etc.

Figure 1C:
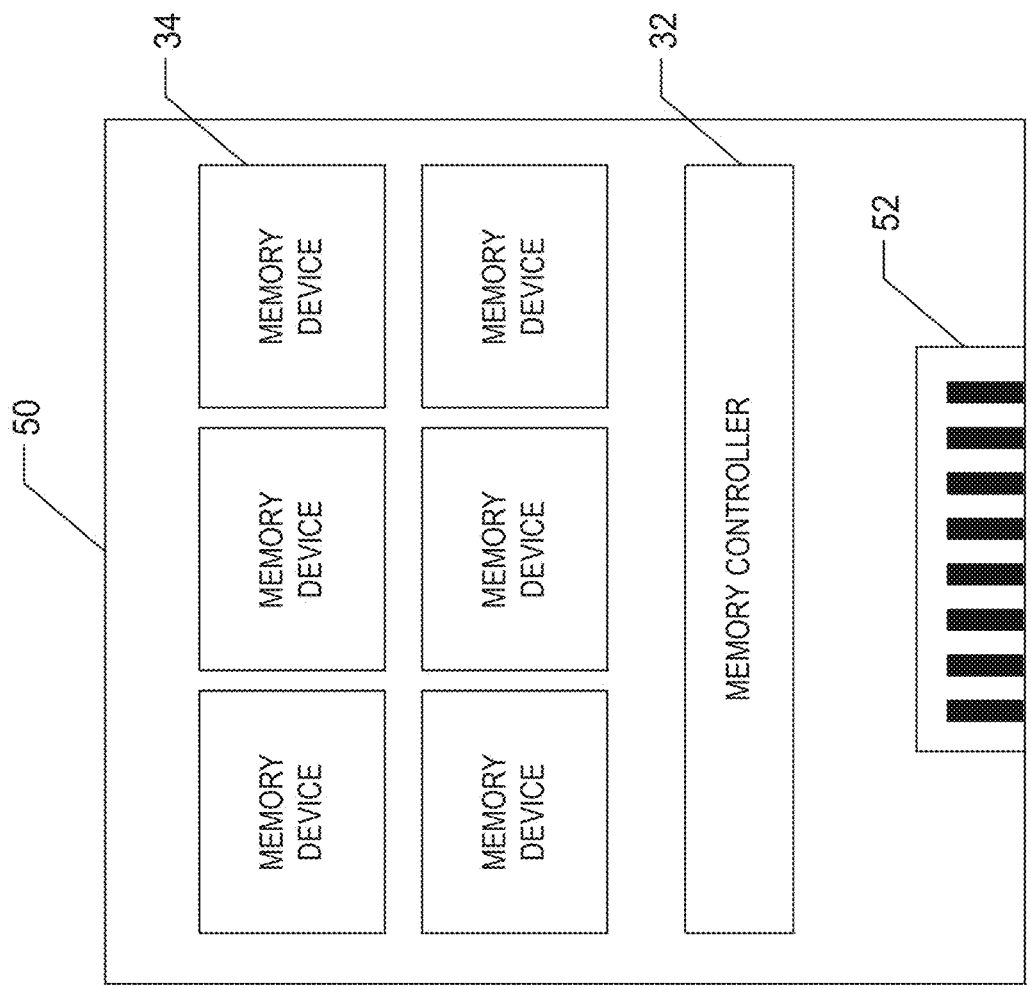
FIG. 1C is a schematic structural diagram of a solid state disk (SSD) provided by an example of the present disclosure.
Figure 1B:
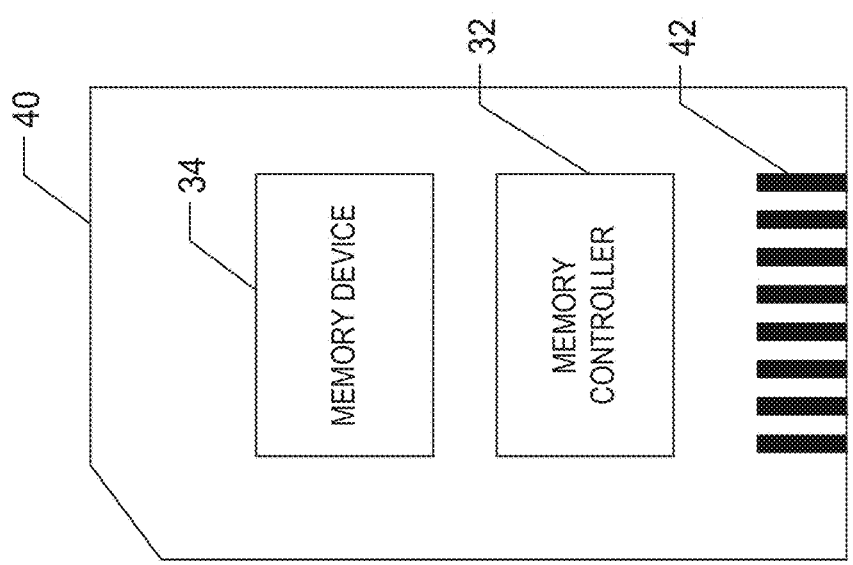
FIG. 1B is a schematic structural diagram of a memory card provided by an example of the present disclosure.

In an example of the present disclosure, the memory controller 32 and one or more memory devices 34 may be integrated into various types of storage apparatuses, e.g., be included in the same package (e.g., a Universal Flash Storage (UFS) package or an eMMC package). That is to say, the memory system 30 may be implemented and packaged into different types of end electronic products. As shown in FIG. 1B, the memory controller 32 and the single memory device 34 may be integrated together to form a memory card 40. The memory card 40 may comprise a PC (Personal Computer Memory Card International Association (PCMCIA)) card, a CF card, a Smart Media (SM), a memory stick, a Multi-Media Card (MMC, Reduced-Size MMC (RS-MMC), MMCmicro), an SD card (SD, miniSD, microSD, and a SDHC (Secure Digital High Capacity)), a UFS, etc. The memory card 40 may further comprise a memory card connector 42 coupling the memory card 40 with a host (e.g., the host 20 in FIG. 1A). In another example shown in FIG. 1C, the memory controller 32 and the plurality of memory devices 34 may be integrated together to form an SSD 50. The SSD 50 may further comprise an SSD connector 52 coupling the SSD 50 with the host (e.g., the host 20 in FIG. 1A). In some implementations, the storage capacity and/or operation speed of the SSD 50 are greater than those of the memory card 40.

It is to be noted that the memory involved in an example of the present disclosure may be a semiconductor memory, which is a solid state electronic device that stores data information and is manufactured using a semiconductor integrated circuit process. In an example, FIG. 1D is a schematic diagram of a memory device 34 in examples of the present disclosure. As shown in FIG. 1D, the memory device 34 may comprise a memory array 62, and a peripheral circuit 64 coupled to the memory array 62, etc. Here, the memory array may be a NAND flash memory array in which memory cells are disposed in a form of an array of NAND memory strings 66 each extending vertically above a substrate. In some examples, each NAND memory string 66 may comprise a plurality of memory cells coupled in series and stacked vertically. Each memory cell may hold a continuous analog value, e.g., voltage or charge, which depends on the number of electrons trapped in a region of the memory cell. Furthermore, the memory cell in the above-mentioned memory array 62 may be either a floating gate type memory cell that comprises a floating gate transistor, or a charge trap type memory cell that comprises a charge trap transistor.

In an example of the present disclosure, the above-mentioned memory cell may be a single level cell (SLC) that has two possible storage states and thus may store one bit of data. For example, a first storage state "0" may correspond to a first threshold voltage range, and a second storage state "1" may correspond to a second threshold voltage range. In some other examples, each memory cell may be a multi level cell (MLC) that can store more than one bit of data. For example, the MLC may store two bits per cell. Each memory cell may be also a triple level cell (TLC), or each memory cell may be also a quad level cell (QLC). Each MLC can be programmed to assume a range of possible nominal storage values. In an example, if each MLC stores two bits of data, the MLC may be programmed to write one of three possible nominal storage values to the memory cell, such that the memory cell is programmed from an erase state to one of three possible program states. A fourth nominal storage value may be used for a corresponding erase state.

Figure 1E:
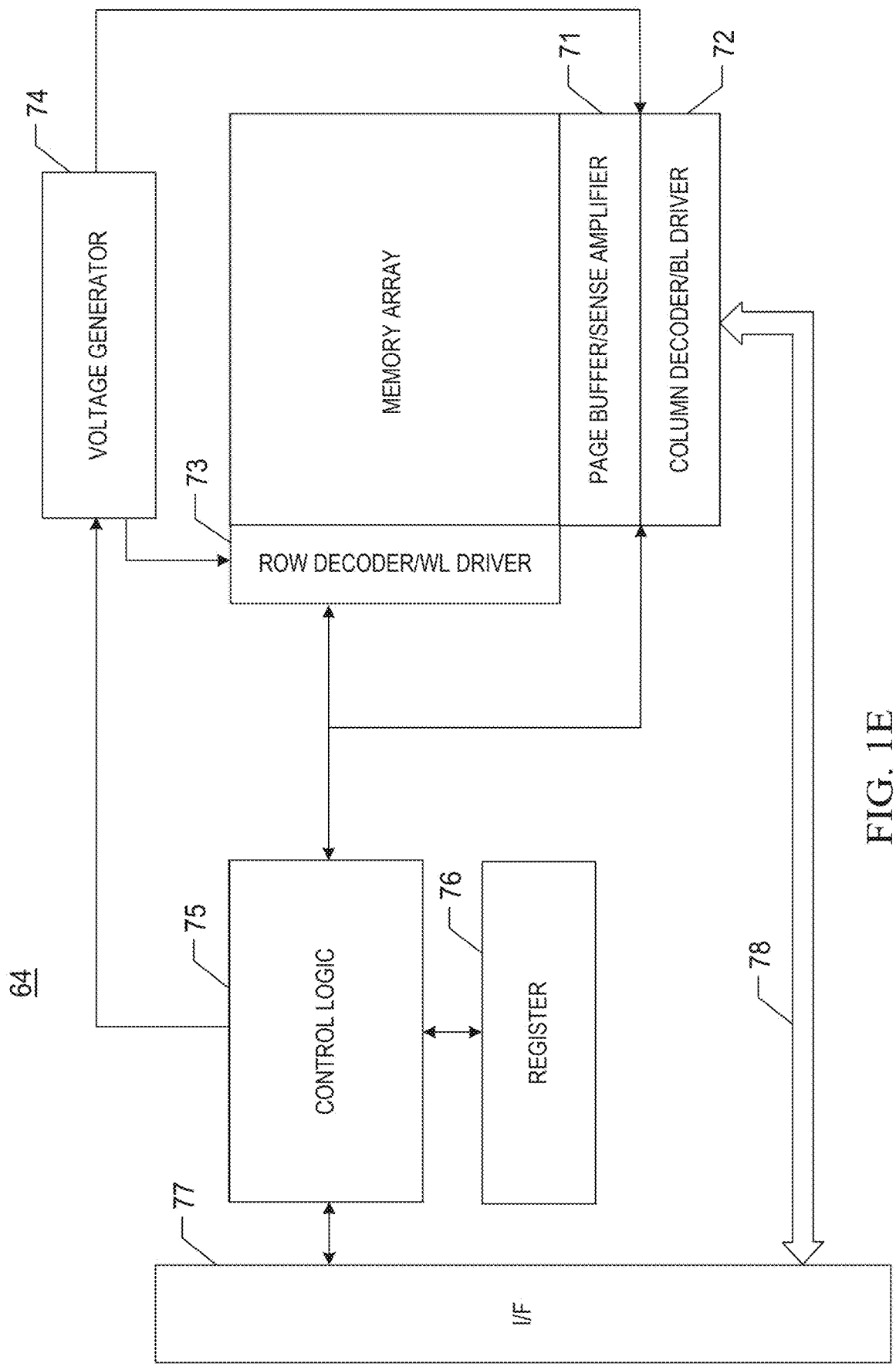

In examples of the present disclosure, the above-mentioned peripheral circuit 64 may be coupled to the memory array through a bit line (BL), a word line (WL), a source line, a source select gate (SSG) (e.g., a top select gate (TSG)), and a drain select gate (DSG) (e.g., a bottom select gate (BSG)). Here, the peripheral circuit 64 may comprise any suitable analog, digital, and hybrid signal circuits for facilitating related operations of the memory array by applying and sensing a voltage signal and/or a current signal to and from each target memory cell through the bit line, the word line, the source line, the SSG, or the DSG, etc. Furthermore, the peripheral circuit 64 may further comprise various types of peripheral circuits formed using a metal-oxide-semiconductor (MOS) technology. In an example, as shown in FIG. 1E, the peripheral circuit 64 may comprise a page buffer (PB)/sensing amplifier 71, a column decoder/bit line driver 72, a row decoder/word line driver 73, a voltage generator 74, a control logic 75, a register 76, an interface 77, and a data bus 78. In some other examples, the peripheral circuit 64 may further comprise additional peripheral circuits not shown in FIG. 1E. In examples of the present disclosure, a memory device as being a NAND flash memory is illustrated as an example.

Due to the demands for a higher storage capacity, a memory cell in the NAND flash memory is configured to be able to store more than 1 bit of data. An nLC NAND flash cell may have $2^n$ states (e.g., $2^n$ different charge ranges are used to represent different states), and thus may store n bits of data. The larger n is, the higher the storage density is. The SLC flash cell may have two states, and thus may store 1 bit of data; the MLC flash cell may have 4 states, and thus may store 2 bits of data; the TLC flash cell may have 8 states, and thus may store 3 bits of data; the QLC flash cell may have 16 states, and thus may store 4 bits of data, and so on.

The $2^n$ state may comprise one erase state and $2^{n-1}$ program states.

Figure 1F:
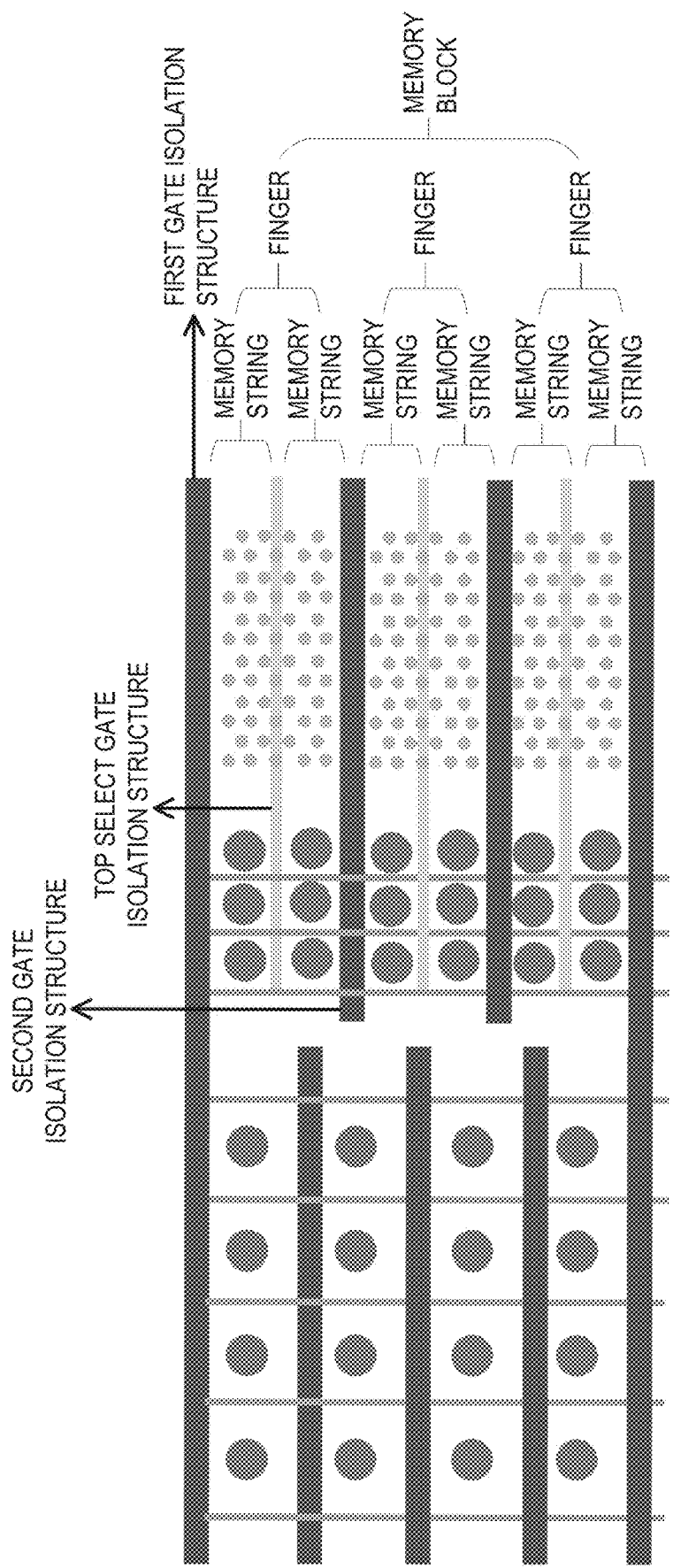
FIG. 1F is a schematic layout diagram of memory cells of a three-dimensional NAND memory according to an example of the present disclosure.

A memory cell array comprises a plurality of groups of memory cells. One of the plurality of groups of memory cells is correspondingly coupled with one word line. A group of memory cells comprises a plurality of subgroups of memory cells. As an example, FIG. 1F shows a schematic structural diagram of a memory array of a three-dimensional NAND memory. As shown in FIG. 1F, the memory array of the three-dimensional NAND memory is composed of a plurality of rows of memory cells that are staggered in parallel and are parallel to a gate isolation structure. Every four rows of memory cells are separated by the gate isolation structure and a top select gate isolation structure. Each row of memory cells comprises a plurality of memory cells. The gate isolation structure may comprise a first gate isolation structure and a second gate isolation structure. The first gate isolation structure divides the memory array into a plurality of memory blocks. A plurality of second gate isolation structures may divide the memory block into a plurality of fingers. The top select gate isolation structure disposed in the middle of each finger may divide the finger into two parts, so as to divide the finger into two memory strings. One memory block shown in FIG. 1F comprises 6 memory strings. In practical application, the number of memory strings in one memory block is not limited thereto. In the examples of the present disclosure, a group of memory cells comprises all memory cells coupled with a word line. Memory cells in the group of memory cells coupled with the word line that belong to the same memory string constitute one subgroup of memory cells. The number of subgroups of memory cells in the group of memory cells may be equal to the number of memory strings in the memory. Each subgroup of memory cells comprises a plurality of memory cells.

The memory cell can store M bits of data. For example, the TLC can store a total of three bits of data, e.g., an upper bit, a middle bit, and a lower bit. The upper bits of the plurality of memory cells in the subgroup of memory cells constitute an upper page, the middle bits of the plurality of memory cells in the subgroup of memory cells constitute a middle page, and the lower bits of the plurality of memory cells in the subgroup of memory cells constitute a lower page.

During a program operation, the maximum number of states of the nLC NAND flash cell is $2^n$, and n bits of data are written to the QLC NAND flash cell as one of the states. The nLC NAND flash cell can store n pages of data. For example, the SLC NAND flash cell may store 1 page of data, the MLC NAND flash cell may store 2 pages of data, the TLC NAND flash cell may store 3 pages of data, and the QLC NAND flash cell may store 4 pages of data, and so on. In an example, 4 bits of data stored in the QLC NAND flash cell may be represented respectively by lower page (LP) data, middle page (MP) data, upper page (UP) data, and extra page (XP) data. The nLC NAND flash can perform a read operation on the data page by page. For example, the LP page may be read first, then the MP page is read, then the UP page is read, and finally the XP page is read.

In coding of a group of numbers, if codes of any two adjacent states differ from each other in only one binary number, such coding is referred to as Gray Code. Because the codes of any adjacent states differ from each other in only one binary number, error correction may be more readily performed on programmed and/or read data using the Gray Code in program and/or read operations.

Figure 3A:
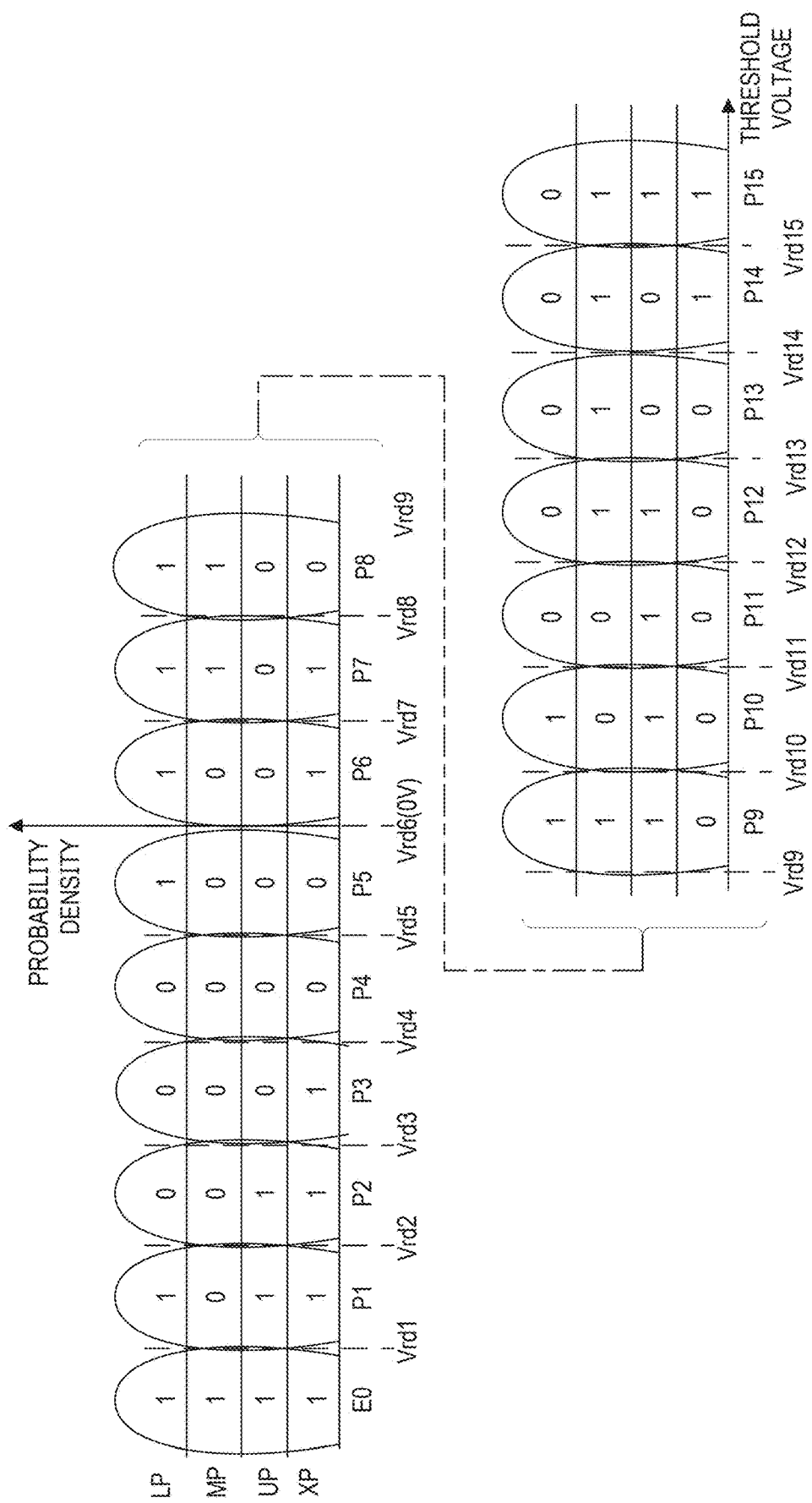
FIG. 3A is a schematic diagram of a set of read voltages corresponding to the Gray Code lookup table shown in FIG. 2 provided by examples of the present disclosure.

In some examples, the memory cells may be programmed using a full sequence programming method. For the QLC NAND flash memory, FIG. 2 illustrates a Gray Code lookup table for the QLC NAND flash memory. The Gray Code lookup table describes a mapping relationship between a state of the QLC NAND flash cell and a logical page. FIG. 3A is a schematic diagram of a set of read voltages corresponding to the Gray Code lookup table shown in FIG. 2 provided by examples of the present disclosure. The abscissa of FIG. 3A is a threshold voltage, and the ordinate of FIG. 3A is probability density. As shown in FIG. 3B, the LP page may be read using a read voltage Vrd2, a read voltage Vrd5, and a read voltage Vrd11; the MP page may be read using a read voltage Vrd1, a read voltage Vrd6, a read voltage Vrd10, and a read voltage Vrd12; the UP page may be read using a read voltage Vrd3, a read voltage Vrd9, a read voltage Vrd13, and a read voltage Vrd15; and the XP page may be read using a read voltage Vrd4, a read voltage Vrd6, a read voltage Vrd8, and a read voltage Vrd14. Vrd1 to Vrd15 form one set of read voltages. FIG. 3B further illustrates example values of read voltages corresponding to each pages. In the read operation, in order to read the state of the QLC NAND flash cell, the LP needs to be read for 3 times, the MP needs to be read for 4 times, the UP needs to be read for 4 times, and the XP needs to be read for 4 times. In an operation of reading the data of the logical page, various read voltages are generated by a voltage generator and applied to the memory cell, and a value of the data of the logical page is determined by whether a control gate of the memory cell is turned on and its corresponding operation expression. For example, when the read voltage is applied on the memory cell and the control gate is turned on, a value of "1" is output. When the voltage is applied on the memory cell and the control gate is not turned on, a value of "0" is output. By taking the LP page as an example, by substituting 3 output values corresponding to 3 read operations thereof into a corresponding operation expression, the value of the data of the logical page data may be determined. It may be understood that operation expressions corresponding to different Gray Code lookup tables are different. The Gray Code lookup table in FIG. 2 is merely an example of the Gray Code lookup table corresponding to the QLC NAND flash cell. The QLC NAND flash cell may correspond to a plurality of Gray Code lookup tables. The sets of read voltages corresponding to different Gray Code lookup tables are different. Therefore, once the Gray Code lookup table for the QLC NAND flash cell is determined, its corresponding set of read voltages is determined.

Figure 4:
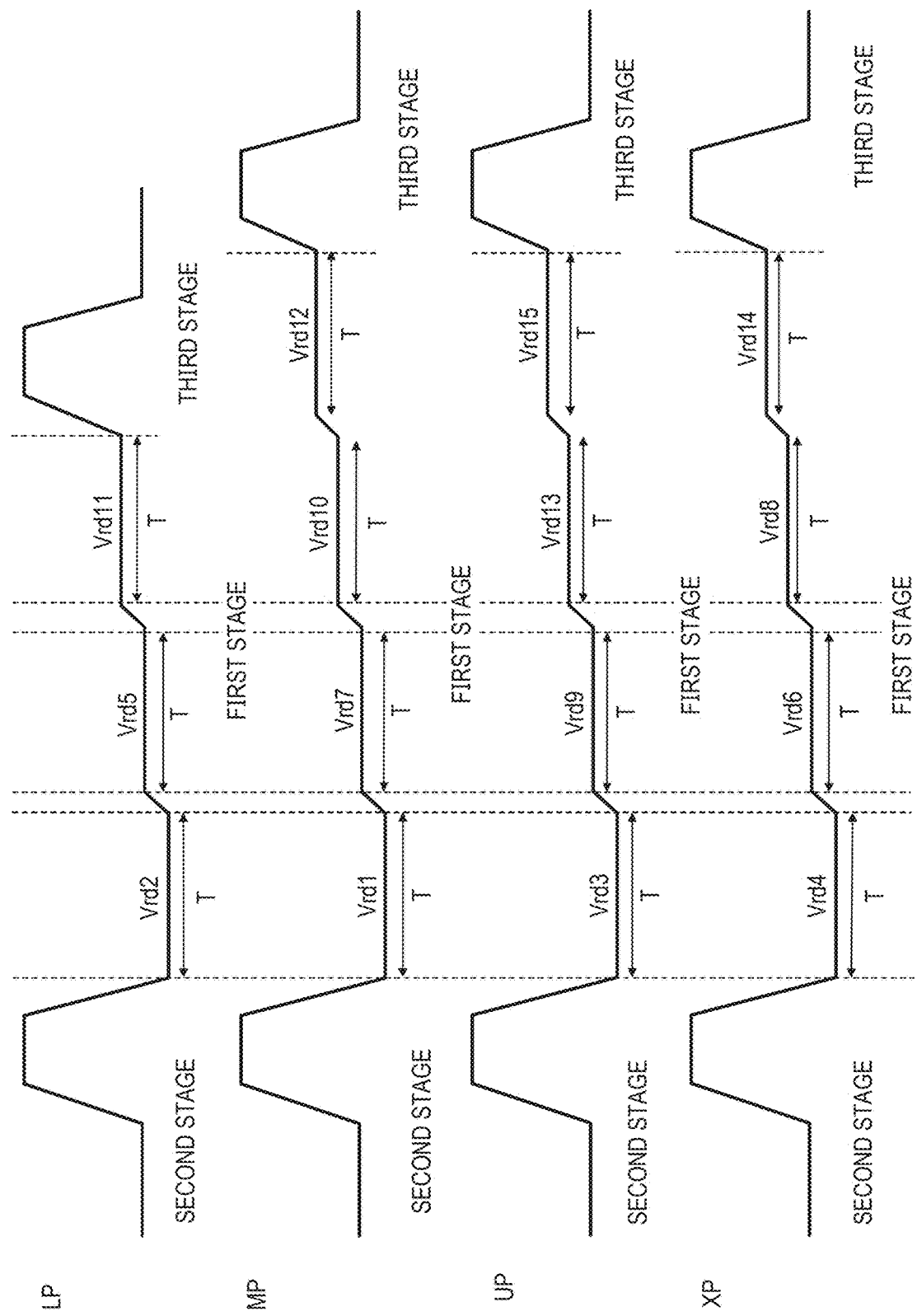
FIG. 4 is a schematic waveform diagram of read operations performed on pages of memory cells to be read in some examples.

In some examples, as shown in FIG. 4, a process of performing a read operation on QLC-type memory cells to be read may be performing the read operation on the memory cells to be read page by page. For example, the operation is sequentially performed on the LP page, the MP page, the UP page, and the XP page. In this example, different read voltages are applied to a selected word line to perform the read operation sequentially on each page of the memory cells to be read, and durations T of the different read voltages are all the same. That is, a duration of Vrd1=a duration of Vrd2=a duration of Vrd3= . . . =a duration of Vrd15$d$=T. The duration of the read voltage comprises a setup time of read voltage and a sensing time of read voltage. The duration T of the read voltage may not be too short, otherwise some of the read voltages may not reach their target values, such that the read operation cannot be correctly performed on the page of the memory cells to be read. In order to ensure that each read voltage (Vrd1 to Vrd15) can reach its target value in the duration of the read voltage, the duration T of the read voltage is relatively long. The read duration of the memory cells to be read is equal to a sum of read durations of all pages of the memory cells to be read. It may be understood that, the longer a duration of each read voltage is, the longer a read duration of each page is, and thus the read durations of all pages are longer. The length of the read duration is one important performance indicator of evaluating the NAND flash memory cell. The shorter the read duration is, the faster the read speed of the NAND is, and the better its performance is.

Examples of the present disclosure provide a memory device. The memory device comprises a peripheral circuit and a memory cell array coupled with the peripheral circuit.

The memory cell array comprises a plurality of groups of memory cells. One of the plurality of groups of memory cells is correspondingly coupled with one word line. The peripheral circuit is configured to: apply a first read voltage to a selected word line in a first duration, to perform a read operation on a first page of memory cells to be read; and apply a second read voltage to the selected word line in a second duration, to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

The examples of the present disclosure are applicable to an nLC NAND flash cell, wherein n is greater than or equal to 2. The memory cell as being a QLC NAND flash cell is illustrated as an example. The read operation may be performed on the QLC NAND flash cell using the read voltage Vrd1 to the read voltage Vrd15. A duration corresponding to the read voltage Vrd1 is t1, a duration corresponding to the read voltage Vrd2 is t2, a duration corresponding to the read voltage Vrd3 is t3 . . . , and a duration corresponding to the read voltage Vrd15 is t15. In the examples of the present disclosure, one of the LP page, the MP page, the UP page, and the XP page may be selected as the first page, and one of the rest of the pages may be selected as the second page. A duration corresponding to a first read voltage of the first page is compared with a duration corresponding to a first read voltage of the second page, wherein the duration corresponding to the first read voltage is the first duration, and the duration corresponding to the second read voltage is the second duration. The relationship of length between the first duration and the second duration is related to the relationship of magnitude between the first voltage difference and the second voltage difference. Here, the first voltage difference is the absolute value of the voltage difference between the first read voltage and the initial voltage in the first duration, and the second voltage difference is the absolute value of the voltage difference between the second read voltage and the initial voltage in the second duration. The initial voltage in the examples of the present disclosure may be a start voltage provided by a read voltage source.

In some examples, the memory device stores a read voltage table that comprises each read voltage required by the read operation; and the peripheral circuit is configured to: acquire each read voltage from the read voltage table, to perform the read operation on each page of the memory cells to be read.

In the above examples, because the read voltage table stores each read voltage required by the read operation, the duration corresponding to each read voltage may be calculated in the peripheral circuit according to an absolute value of a difference between each read voltage and its corresponding initial voltage.

In some examples, the memory device stores a read voltage table that comprises each read voltage required by the read operation and a duration corresponding to each read voltage. The peripheral circuit is configured to: acquire each read voltage and the duration corresponding to each read voltage from the read voltage table, to perform the read operation on each page of the memory cells to be read.

In the above example, the read voltage table stores each read voltage required by the read operation and the duration corresponding to each read voltage, and the duration may be obtained by testing a test memory device in advance. In the examples of the present disclosure, each read voltage and the duration corresponding to each read voltage may be directly acquired from the read voltage table, to perform the read operation on each page of the memory cells to be read, without additional calculation in the peripheral circuit, which can further save the time required for calculation.

In some examples, the peripheral circuit is further configured to: receive a command of performing the read operation separately on each page of the memory cells to be read; acquire the first read voltage and the second read voltage; and determine the first duration according to the first voltage difference, and determine the second duration according to the second voltage difference.

In the examples of the present disclosure, an external device (e.g., a host) sends a read request, and a memory controller may receive the read request. The read request comprises a logical address corresponding to the memory cell to be read. In addition, the memory controller or the memory device may maintain a logical to physical address conversion mapping table. According to this mapping table, a physical address of the memory cell to be read in the memory device may be acquired through the logical address in the read request. That is, the memory controller may decode the logical address corresponding to the memory cell to be read in the read request, and after decoding, send the command of performing the read operation separately on each page of the memory cells to be read to the memory device. The peripheral circuit of the memory device receives the command.

In the examples of the present disclosure, the first read voltage and the second read voltage may be acquired from the read voltage table, and the first voltage difference and the second voltage difference may be obtained through calculation. The first voltage difference may be k1 times of a standard voltage difference (e.g., 1 V), and the first duration may be k1 times of a standard duration corresponding to the standard voltage difference. Similarly, the second voltage difference may be k2 times of a standard voltage difference (e.g., 1 V), and the second duration may be k2 times of the standard duration corresponding to the standard voltage difference. As such, the first duration may be determined by the first voltage difference, and the second duration may be determined by the second voltage difference.

Here, the first voltage difference is the absolute value of the voltage difference between the first read voltage and the initial voltage in the first duration, and the second voltage difference is the absolute value of the voltage difference between the second read voltage and the initial voltage in the second duration. The initial voltage in the examples of the present disclosure may be a start voltage provided by a read voltage source.

In an example, the relationship of length between the first duration and the second duration is related to the relationship of magnitude between the first voltage difference and the second voltage difference, which may be categorized into three scenarios below. Scenario I: The first voltage difference is greater than the second voltage difference, and the first duration is longer than the second duration. Scenario II: The first voltage difference is smaller than the second voltage difference, and the first duration is shorter than the second duration. Scenario III: The first voltage difference is equal to the second voltage difference, and the first duration is equal to the second duration. In other words, the first duration may be determined based on the first voltage difference, and the second duration may be determined based on the second voltage difference. The larger the voltage difference is, the longer the duration is; and the smaller the voltage difference is, the shorter the duration is.

In the examples of the present disclosure, the length of each read duration is not a fixed value, but is determined according to the voltage difference (that is, the absolute value of the difference between the read voltage and the initial voltage in the duration). As such, the duration corresponding to each read voltage may be precisely determined. The first read voltage is applied to the selected word line in the first duration, to perform a read operation on the first page of the memory cells to be read. The second read voltage is applied to the selected word line in the second duration, to perform a read operation on the second page of the memory cells to be read. Therefore, the duration corresponding to each read voltage has varied length. It may be understood, in the examples of the present disclosure, the longest duration may not exceed the duration T in the above examples. Therefore, the durations of at least some of the read voltages may be smaller than the duration T. The read duration of the memory cells to be read is equal to a sum of read durations of all pages of the memory cells to be read. It may be understood that, in the examples of the present disclosure, a duration of a corresponding read voltage may be determined according to the voltage difference between the read voltage and the initial voltage. Therefore, the durations of at least some of the read voltages applied on the selected word line are shortened, such that an overall read duration of the memory cells to be read is shortened, and read performance of the NAND flash memory cell is effectively improved.

The examples of the present disclosure are applicable to products with high storage density. Since its program time continues to increase and the main application scenario is read-intensive, a shorter overall read duration is required.

Figure 7:
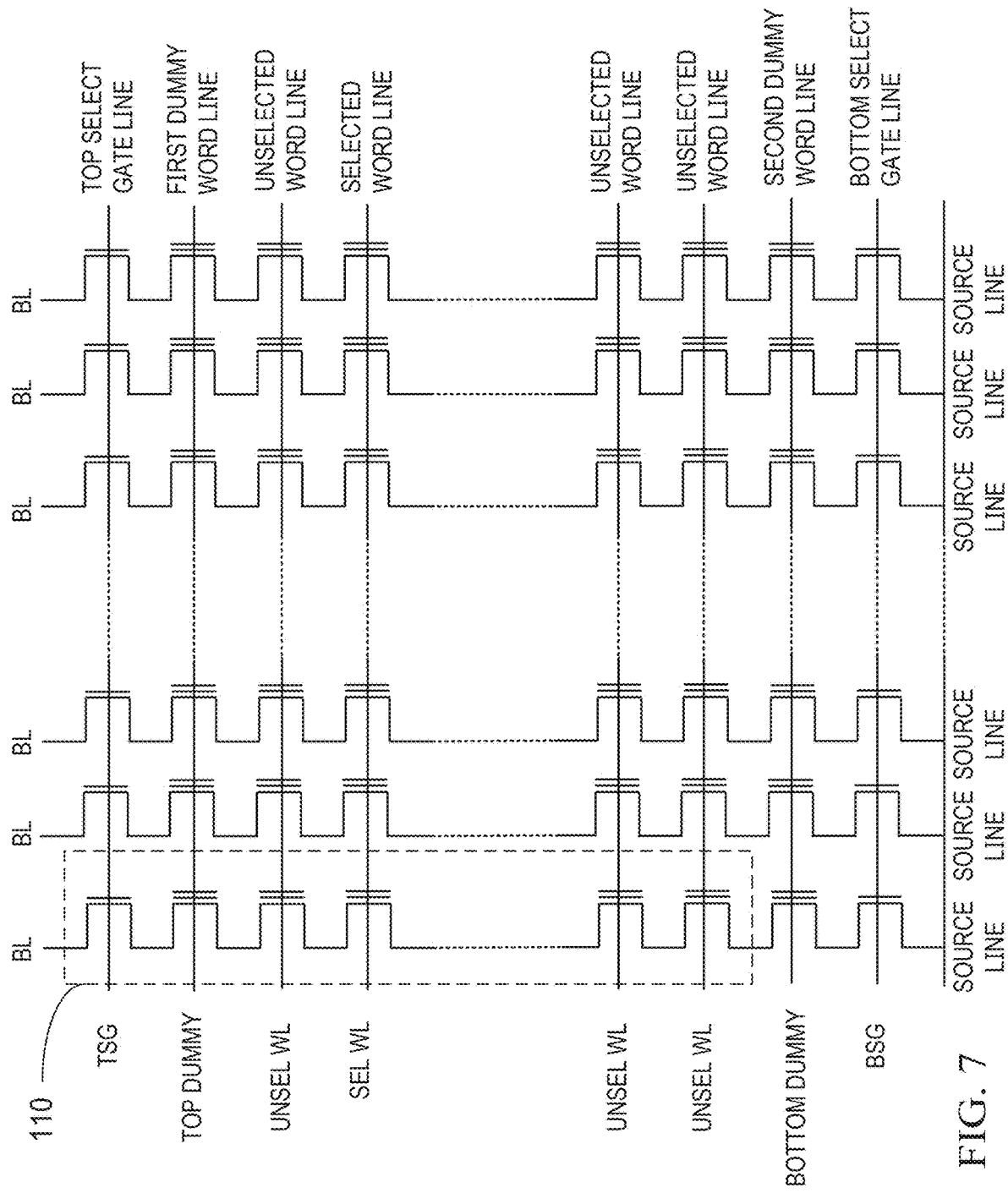
FIG. 7 is a schematic diagram of a plurality of memory strings provided by examples of the present disclosure.

As shown in FIG. 7, the memory cell array comprises a plurality of memory strings 110. An upper end of each memory string 110 is connected with a bit line (BL), and a lower end of each memory string 110 is connected with a source line. Each memory string 110 comprises a top select gate, a first dummy memory cell (TOP Dummy), a second dummy memory cell (Bottom Dummy), a bottom select gate, and a plurality of memory cells. The plurality of top select gates are coupled with a top select gate line, the plurality of bottom select gates are coupled with a bottom select gate line, the plurality of first dummy memory cells are coupled with a first dummy word line, the plurality of second dummy memory cells are coupled with a second dummy word line, and the plurality of memory cells are coupled with a word line. The first dummy word line is located between the top select gate and the word line, and the second dummy word line is located between the bottom select gate and the word line. A word line where the memory cells to be read are located is referred to as a selected word line (Sel WL), and other word lines are referred to as unselected word lines (Unsel WL). The top select gate in the memory string where the memory cells to be read are located is referred to as a selected top select gate (Sel TSG), and other top select gates are referred to as unselected top select gates (Unsel TSG).

One of the functions of the dummy memory cell coupled with the dummy word line is to protect the memory cell at an edge coupled with the word line, such that the memory cell at the edge has the same surroundings as the memory cells in other positions, so as to improve the data access accuracy of the memory cell at the edge. The dummy memory cell may be or may not be used to store data.

In some examples, the read operation further comprises a second stage before the first stage and a third stage after the first stage. The peripheral circuit is configured to: at the second stage, apply a first pass voltage to a word line coupled with the memory cells to be read, and apply a second pass voltage to an unselected word line; and at the third stage, apply a third pass voltage to a word line coupled with the memory cells to be read, and apply a fourth pass voltage to an unselected word line.

The examples of the present disclosure is illustrated below in conjunction with FIGS. 6 and 7.

Figure 6:
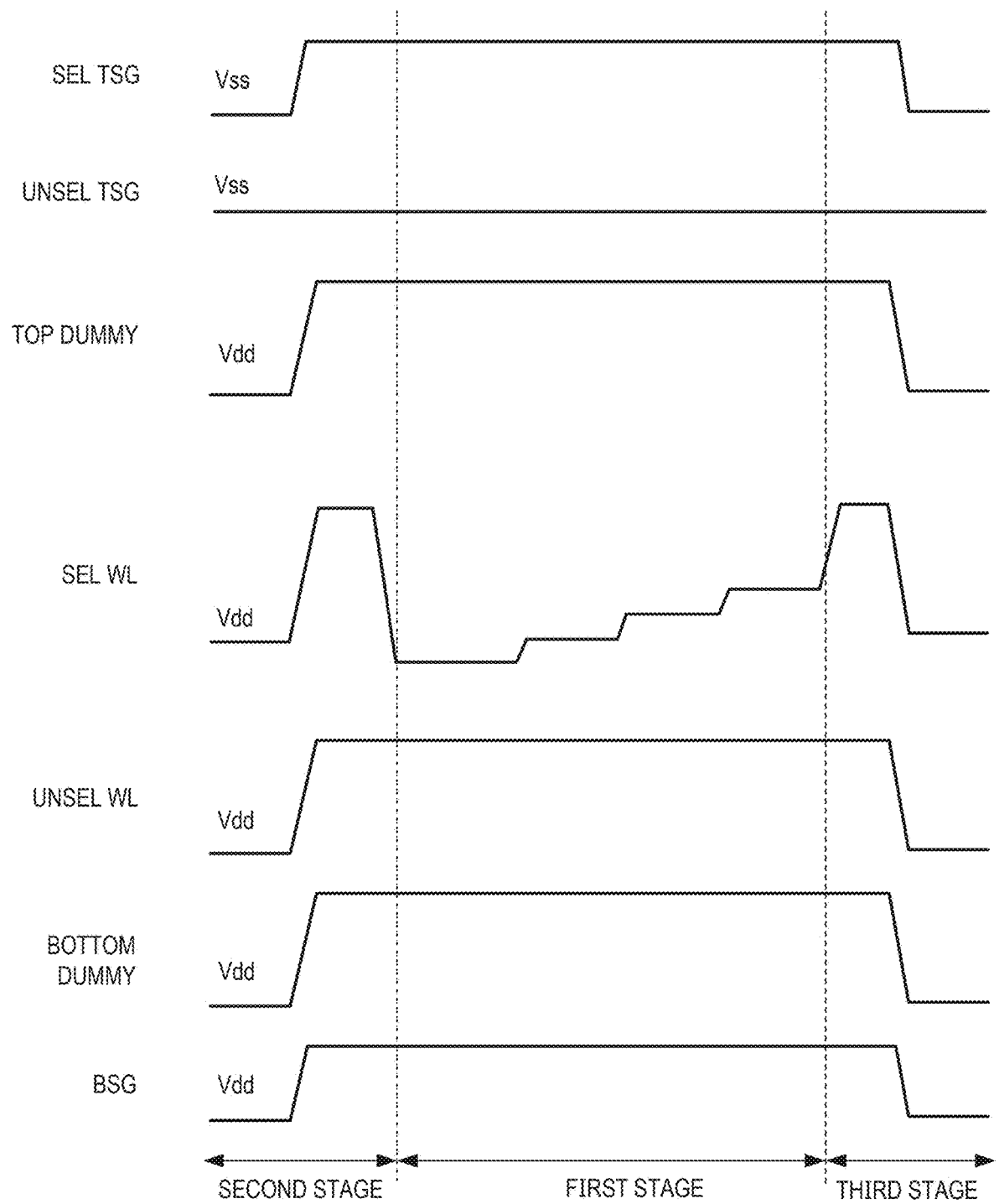
FIG. 6 illustrates a schematic waveform diagram of voltages applied to a selected top select gate, an unselected top select gate, a first dummy word line, a selected word line, an unselected word line, a second dummy word line, and a selected bottom select gate at a first stage to a third stage.

FIG. 6 illustrates a schematic waveform diagram of voltages applied to a selected top select gate, an unselected top select gate, a first dummy word line, a selected word line, an unselected word line, a second dummy word line, and a selected bottom select gate at a first stage to a third stage.

In some examples, the read operation comprises a second stage, a first stage, and a third stage that occur in sequence.

In an example, at the second stage, the second pass voltage is applied to the unselected word line, and the first pass voltage is applied to the selected word line (e.g., the word line coupled with the memory cells to be read), to reset channels of the selected memory string and the unselected memory string. During the rising of the voltages of the unselected word line and the selected word line, voltages applied to the top select gate of the unselected memory string and the bottom select gate of the unselected memory string also rise, such that the top select gate of the unselected memory string and the bottom select gate of the unselected memory string both are turned on. Corresponding pass voltages are also applied to the top select gate of the selected memory string, the bottom select gate of the selected memory string, and the first dummy memory cell and the second dummy memory cell of the selected memory string, such that the top select gate of the selected memory string, the bottom select gate of the selected memory string, and the first dummy memory cell and the second dummy memory cell of the selected memory string are all turned on. At the same time, the bit line remains at a low level. In the examples of the present disclosure, the low level may be 0 V. The channels of the unselected memory string and the selected memory string are connected through with the bit line, and potentials of the channels are maintained at the same low level as the bit line. Therefore, no voltage will be generated by coupling between the channels of the unselected memory string and the selected memory string due to a variation in a word line voltage, thereby avoiding disturbance due to hot carrier injection when a pass voltage is applied to the word line of the unselected memory cell. In the examples of the present disclosure, a low level is also applied to the top select gate of the unselected memory string, such that the top select gate of the unselected memory string is in an off state. In some examples, the first pass voltage may be equal to the second pass voltage. In some other examples, the first pass voltage may be greater than the second pass voltage.

At the first stage, the second pass voltage continues to be applied to the unselected word line, and the read voltage, which may be applied according to the waveform diagram shown in FIG. 5 that is introduced in detail below, is applied based on pages to the selected word line (e.g., the word line coupled with the memory cells to be read), to perform the read operation on the memory cells to be read. Corresponding pass voltages also continue to be applied to the top select gate of the selected memory string, the bottom select gate of the selected memory string, and the first dummy memory cell and the second dummy memory cell of the selected memory string, such that the top select gate of the selected memory string, the bottom select gate of the selected memory string, and the first dummy memory cell and the second dummy memory cell of the selected memory string all maintain an on state; at the same time, the bit line continuously remains at a low level, and a low level continues to be applied to the top select gate of the unselected memory string, such that the top select gate of the unselected memory string continues to be in the off state.

At the third stage, the fourth pass voltage is applied to the unselected word line and the third pass voltage is applied to the selected word line, to reset the channels of the selected memory string and the unselected memory string once again. Corresponding pass voltages also continue to be applied to the top select gate of the selected memory string, the bottom select gate of the selected memory string, and the first dummy memory cell and the second dummy memory cell of the selected memory string, such that the top select gate of the selected memory string, the bottom select gate of the selected memory string, and the first dummy memory cell and the second dummy memory cell of the selected memory string all maintain an on state; at the same time, the bit line continuously remains at a low level, and a low level continues to be applied to the top select gate of the unselected memory string, such that the top select gate of the unselected memory string continues to be in the off state.

In some examples, the read operation corresponding to each page of the memory cells to be read comprises the first stage that comprises at least one read step. In the examples of the present disclosure, one read step corresponds to one read voltage. As shown in FIG. 5, the read operation performed on the LP page comprises 3 read steps, the read operation performed on the MP page comprises 4 read steps, the read operation performed on the UP page comprises 4 read steps, and the read operation performed on the XP page comprises 4 read steps.

In some examples, the first duration and the second duration are durations required to perform the same read step in the read operation on different pages, respectively. A plurality of read steps in the read operation performed on each page are sorted in sequence, wherein the read steps having the same serial number are referred to as the same read step.

Figure 5:
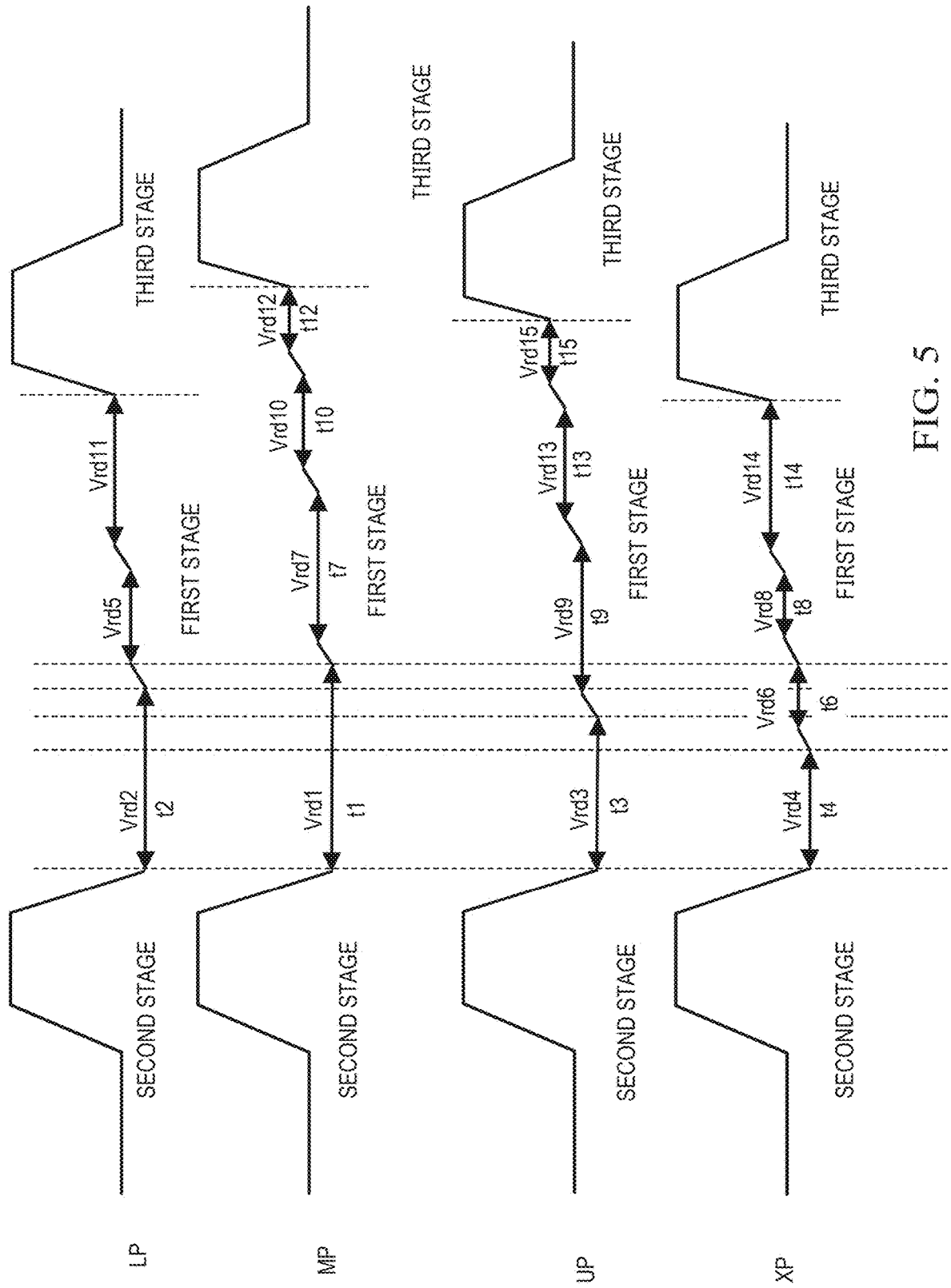
FIG. 5 is a schematic waveform diagram of read operations performed on pages of memory cells to be read provided by examples of the present disclosure.

As shown in FIG. 5, a first read step (corresponding to Vrd2) in the read operation performed on the LP page, a first read step (corresponding to Vrd1) in the read operation performed on the MP page, a first read step (corresponding to Vrd3) in the read operation performed on the UP page, and a first read step (corresponding to Vrd4) in the read operation performed on the XP page may be referred to as the same read step.

A second read step (corresponding to Vrd5) in the read operation performed on the LP page, a second read step (corresponding to Vrd7) in the read operation performed on the MP page, a second read step (corresponding to Vrd9) in the read operation performed on the UP page, and a second read step (corresponding to Vrd6) in the read operation performed on the XP page may be referred to as the same read step.

A third read step (corresponding to Vrd11) in the read operation performed on the LP page, a third read step (corresponding to Vrd10) in the read operation performed on the MP page, a third read step (corresponding to Vrd13) in the read operation performed on the UP page, and a third read step (corresponding to Vrd8) in the read operation performed on the XP page may be referred to as the same read step.

A fourth read step (corresponding to Vrd12) in the read operation performed on the MP page, a fourth read step (corresponding to Vrd15) in the read operation performed on the UP page, and a fourth read step (corresponding to Vrd14) in the read operation performed on the XP page may be referred to as the same read step.

In some examples, the first duration and the second duration may be durations required to perform different read steps in the read operation on different pages, respectively.

For example, the first duration may be a duration t2 required to perform the first read step in the read operation on the LP page, and the second duration may be a duration t7 required to perform the second read step in the read operation on the MP page.

In some examples, the first duration and the second duration each may be a duration required to perform the same read step in the read operation on the different pages.

For example, the first duration may be a duration t2 required to perform the first read step in the read operation on the LP page, and the second duration may be a duration t3 required to perform the first read step in the read operation on the MP page.

For another example, the first duration may be a duration t1 required to perform the third read step in the read operation on the LP page, and the second duration may be a duration t10 required to perform the third read step in the read operation on the MP page.

In some examples, the first duration and the second duration are durations required to perform the first read step in the read operation on different pages of the memory cells to be read, respectively. The initial voltage in the first duration is equal to the initial voltage in the second duration, a magnitude of the first read voltage is different from a magnitude of the second read voltage, and a length of the first duration is different from a length of the second duration.

An initial voltage of the first read step in the read operation performed on the different pages is equal to the start voltage provided by the read voltage source.

In the examples of the present disclosure, the start voltage provided by the read voltage source as being VSS is illustrated as an example. It should be understood that, the start voltage provided by the read voltage source is not limited by the examples of the present disclosure.

In the examples of the present disclosure, each duration (e.g., the first duration and the second duration) comprises a setup time of read voltage and a sensing time of read voltage. The setup time of read voltage refers to a duration in which the initial voltage varies to the read voltage. The sensing time of read voltage refers to a duration when the read voltage is stable. It may be understood that the read operation may be performed on the memory cells to be read only when the read voltage is stable.

Since the read voltages corresponding to the first read steps of the pages are different, the setup times of read voltage required for a voltage on the selected word line to vary from the initial voltage to the read voltage corresponding to the first read step of each page are also different.

In the examples of the present disclosure, the sensing time of read voltage in the first duration is equal to the sensing time of read voltage in the second duration, and a relationship of magnitude between the setup time of read voltage in the first duration and the setup time of read voltage in the second duration is related to a relationship of magnitude between the first voltage difference and the second voltage difference.

Figure 8:
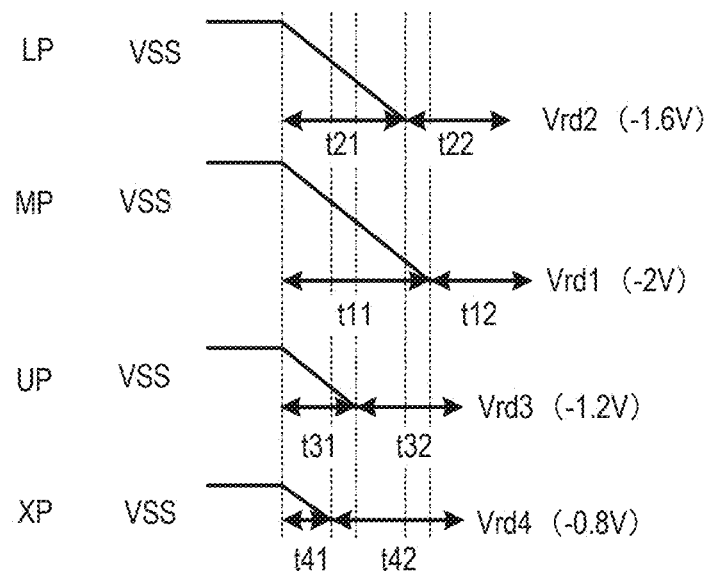
FIG. 8 is a schematic diagram I of a waveform varying from an initial voltage to a read voltage corresponding to a first read step of each page provided by examples of the present disclosure.

The start voltage provided by the read voltage source as being VSS is illustrated as an example in conjunction with FIGS. 3B, 5, and 8.

The absolute value of a voltage difference between the initial voltage and the read voltage Vrd2 is 1.6 V, an absolute value of a voltage difference between the initial voltage and the read voltage Vrd1 is 2 V, an absolute value of a voltage difference between the initial voltage and the read voltage Vrd3 is 1.2 V, and an absolute value of a voltage difference between the initial voltage and the read voltage Vrd4 is 0.8 V. Since 2 V>1.6 V>1.2 V>0.8 V, it may be understood that when the absolute value of the voltage difference between the initial voltage and the read voltage is larger, the setup time of read voltage is longer. Therefore, the setup time t11 of the read voltage Vrd1>the setup time t21 of the read voltage Vrd2>the setup time t31 of the read voltage Vrd3>the setup time t41 of the read voltage Vrd4. The sensing times of the read voltages required to perform the read steps of the read operation on the pages are the same, that is, the sensing time t12 of the read voltage Vrd1=the sensing time t22 of the read voltage Vrd2=the sensing time t32 of the read voltage Vrd3=the sensing time t42 of the read voltage Vrd4. In summary, in the examples of the present disclosure, the duration t1 (t1=t11+t12) of the read voltage Vrd1>the duration t2 (t2=t21+t22) of the read voltage Vrd2>the duration t3 (t3=t31+t32) of the read voltage Vrd3>the duration t4 (t4=t41+t42) of the read voltage Vrd4.

Therefore, in the examples of the present disclosure, the first voltage difference, which may be the voltage difference between the initial voltage and the read voltage Vrd2, is smaller than the second voltage difference, which may be the voltage difference between the initial voltage and the read voltage Vrd1); and the setup time of read voltage in the first duration is shorter than the setup time of read voltage in the second duration.

Figure 9:
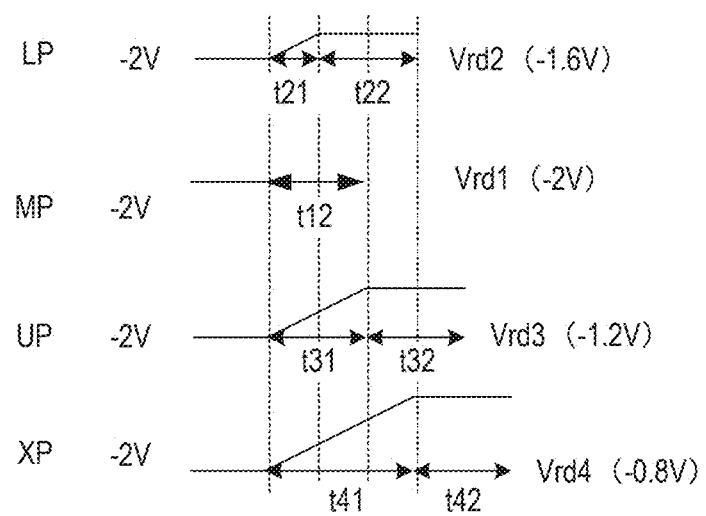
FIG. 9 is a schematic diagram II of a waveform varying from an initial voltage to a read voltage corresponding to a first read step of each page provided by examples of the present disclosure.

The start voltage provided by the read voltage source as being −2 V is illustrated as another example in conjunction with FIGS. 3B, 5, and 9.

The absolute value of the voltage difference between the initial voltage and the read voltage Vrd2 is 0.4 V, the absolute value of the voltage difference between the initial voltage and the read voltage Vrd1 is 0.8 V, the absolute value of the voltage difference between the initial voltage and the read voltage Vrd3 is 1.2 V, and the absolute value of the voltage difference between the initial voltage and the read voltage Vrd4 is 0 V. Since 1.2 V>0.8 V>0.4 V>0 V, it may be understood that, when the absolute value of the voltage difference between the initial voltage and the read voltage is larger, the setup time of read voltage is longer. Therefore, the setup time t41 of the read voltage Vrd4>the setup time t31 of the read voltage Vrd3>the setup time t11 of the read voltage Vrd1>the setup time t21 of the read voltage Vrd2, and t21=0. The sensing times of the read voltages required to perform the read steps of the read operation on the pages are the same, that is, the sensing time t42 of the read voltage Vrd4=the sensing time t22 of the read voltage Vrd2=the sensing time t12 of the read voltage Vrd1=the sensing time t32 of the read voltage Vrd3. In summary, in the examples of the present disclosure, the duration t4 (t4=t41+t42) of the read voltage Vrd4>the duration t3 (t3=t31+t32) of the read voltage Vrd3>the duration t1 (t1=t12) of the read voltage Vrd1>the duration t2 (t2=t21+t22) of the read voltage Vrd2.

Therefore, in the examples of the present disclosure, the first voltage difference (e.g., the voltage difference between the initial voltage and the read voltage Vrd2) is greater than the second voltage difference (e.g., the voltage difference between the initial voltage and the read voltage Vrd1), and the setup time of read voltage in the first duration is longer than the setup time of read voltage in the second duration.

In some other examples, the first voltage difference may be also equal to the second voltage difference, and the setup time of read voltage in the first duration is equal to the setup time of read voltage in the second duration.

It may be understood that, in the examples of the present disclosure, the start voltages of the read voltage source are different, and the durations corresponding to the read voltages required to perform the first read step of the read operation on the pages are also different.

The above start voltage of the read voltage source is merely an example, and is not limited by the examples of the present disclosure.

In some examples, the first duration and the second duration are durations required to perform an $N^{th}$ read step in the read operation on different pages of the memory cells to be read, respectively; N is an integer greater than 1; and the initial voltage in the first duration is different from the initial voltage in the second duration, the initial voltage in the first duration is equal to a read voltage applied to the first page of the memory cells to be read in an $(N-1)^{th}$ read step, and the initial voltage in the second duration is equal to a read voltage applied to the second page of the memory cells to be read in the $(N-1)^{th}$ read step.

The $N^{th}$ read step as being the second read step is illustrated as an example in conjunction with FIGS. 3B, 5, and 10. It should be understood that the present disclosure is not limited thereto.

For the LP page, the absolute value of the voltage difference between the initial voltage (which is a read voltage Vrd2 of a previous read step at this point) and the read voltage Vrd5 is 1.2 V. For the MP page, the absolute value of the voltage difference between the initial voltage (which is a read voltage Vrd1 of the previous read step at this point) and the read voltage Vrd7 is 2.4 V. For the UP page, the absolute value of the voltage difference between the initial voltage (which is a read voltage Vrd3 of the previous read step at this point) and the read voltage Vrd9 is 2.4 V. For the XP page, the absolute value of the voltage difference between the initial voltage (which is a read voltage Vrd4 of the previous read step at this point) and the read voltage Vrd6 is 0.8 V. Since 2.4 V=2.4 V>1.2 V>0.8 V, it may be understood that, when the absolute value of the voltage difference between the initial voltage (which is the read voltage in the previous read step) and the read voltage is larger, the setup time of read voltage is longer. Therefore, the setup time t71 of the read voltage Vrd7=the setup time t91 of the read voltage Vrd9>the setup time t51 of the read voltage Vrd5>the setup time t61 of the read voltage Vrd6. The sensing times of the read voltages required to perform the read steps of the read operation on the pages are the same, that is, the sensing time t52 of the read voltage Vrd5=the sensing time t62 of the read voltage Vrd6=the sensing time t72 of the read voltage Vrd7=the sensing time t92 of the read voltage Vrd9. In summary, in the examples of the present disclosure, the duration t7 (17=171+172) of the read voltage Vrd7=the duration 19 (19=t91+192) of the read voltage Vrd9>the duration t5 (15=t51+152) of the read voltage Vrd5>the duration 16 (t6=161+162) of the read voltage Vrd6.

In some other examples, the first duration and the second duration are durations required to perform the $N^{th}$ read step in the read operation on different pages of the memory cells to be read, respectively; and N is an integer greater than 1. The initial voltage in the first duration is equal to the initial voltage in the second duration, and the initial voltage is equal to a start voltage provided by the read voltage source.

In some examples, the peripheral circuit is further configured to: apply a third read voltage to the selected word line in a third duration after the first duration, to perform a read operation on the first page of the memory cells to be read; and apply a fourth read voltage to the selected word line in a fourth duration after the second duration, to perform a read operation on the second page of the memory cells to be read, wherein the first read voltage is smaller than the third read voltage, and the second read voltage is smaller than the fourth read voltage; or the first read voltage is greater than the third read voltage, and the second read voltage is greater than the fourth read voltage.

In some examples, voltage values of Vrd1 to Vrd15 increase sequentially.

For example, if the read voltage Vrd2 in FIG. 5 is selected as the first read voltage, and the duration t2 corresponding to the read voltage Vrd2 is selected as the first duration, the read voltage Vrd5 or the read voltage Vrd11 may be regarded as the third read voltage, and the duration t5 corresponding to the read voltage Vrd5 or the duration t11 corresponding to the read voltage Vrd11 may be regarded as the third duration. At this point, the first read voltage is smaller than the third read voltage.

If the read voltage Vrd1 in FIG. 5 is selected as the second read voltage, and the duration t1 corresponding to the read voltage Vrd1 is selected as the second duration, the read voltage Vrd7, the read voltage Vrd10, or the read voltage Vrd12 may be regarded as the fourth read voltage, and the duration 17 corresponding to the read voltage Vrd7, the duration t10 corresponding to the read voltage Vrd10, or the duration t12 corresponding to the read voltage Vrd12 may be regarded as the fourth duration. At this point, the second read voltage is smaller than the fourth read voltage.

In some other examples, voltage values of Vrd1 to Vrd15 decrease sequentially. In the third duration after the first duration, the third read voltage is applied to the selected word line to perform a read operation on the first page of the memory cells to be read; in the fourth duration after the second duration, the fourth read voltage is applied to the selected word line to perform a read operation on the second page of the memory cells to be read; and the first read voltage is greater than the third read voltage, and the second read voltage is greater than the fourth read voltage.

The examples of the present disclosure are applicable to a plurality of schemes of read operation, including, but not limited to a scheme of read operation in which the read voltages increase sequentially and a scheme of read operation in which the read voltages decrease sequentially.

In some examples, the peripheral circuit is further configured to: acquire the third read voltage and the fourth read voltage; and determine the third duration and the fourth duration, wherein the third duration is determined based on an absolute value of a voltage difference between the third read voltage and a read voltage required to perform a read operation on the first page of the memory cells to be read in a previous read step, and the fourth duration is determined based on an absolute value of a voltage difference between the fourth read voltage and a read voltage required to perform a read operation on the second page of the memory cells to be read in a previous read step.

In the examples of the present disclosure, the third read voltage and the fourth read voltage may be acquired from the read voltage table. The third voltage difference and the fourth voltage difference are obtained through calculation. Here, the third voltage difference is equal to the absolute value of the voltage difference between the third read voltage and the read voltage required to perform a read operation on the first page of the memory cells to be read in the previous read step, and the fourth voltage difference is equal to the absolute value of the voltage difference between the fourth read voltage and the read voltage required to perform a read operation on the second page of the memory cells to be read in a previous read step. The third voltage difference may be k3 times of a standard voltage difference (e.g., 1 V), and the third duration may be k3 times of a standard duration corresponding to the standard voltage difference. Similarly, the fourth voltage difference may be k4 times of a standard voltage difference (e.g., 1 V), and the fourth duration may be k4 times of a standard duration corresponding to the standard voltage difference. As such, the third duration may be determined by the third voltage difference, and the fourth duration may be determined by the fourth voltage difference.

Examples of the present disclosure further provide a memory system that comprises a memory device and a memory controller coupled with the memory device. The memory device comprises a memory cell array. The memory cell array comprises a plurality of groups of memory cells, and one of the plurality of groups of memory cells is correspondingly coupled with one word line. The memory controller is configured to: acquire a first read voltage, and determine a first duration in which the first read voltage is applied to a selected word line to perform a read operation on a first page of memory cells to be read; and acquire a second read voltage, and determine a second duration in which the second read voltage is applied to the selected word line to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In some examples, the memory device stores a read voltage table that comprises each read voltage required by the read operation and a duration corresponding to each read voltage. The memory controller is configured to: acquire the read voltages from the read voltage table. The read voltages include the first read voltage and the second read voltage.

The initial voltage in the examples of the present disclosure may be a start voltage provided by a read voltage source, or may be also a read voltage in the previous read step. After the initial voltage is determined, the above-mentioned first voltage difference and the second voltage difference may be obtained through calculation in the memory controller. The first voltage difference may be k1 times of a standard voltage difference (e.g., 1 V), and the first duration may be k1 times of a standard duration corresponding to the standard voltage difference. Similarly, the second voltage difference may be k2 times of a standard voltage difference (e.g., 1 V), and the second duration may be k2 times of a standard duration corresponding to the standard voltage difference. As such, the first duration may be determined by the first voltage difference, and the second duration may be determined by the second voltage difference.

In the examples of the present disclosure, the length of each read duration is not a fixed value, but is determined according to the voltage difference (that is, the absolute value of the difference between the read voltage and the initial voltage in the duration). As such, the duration corresponding to each read voltage may be determined precisely, such that the duration corresponding to each read voltage has varied length. It may be understood, in the examples of the present disclosure, the longest duration may not exceed the duration T in the above examples. Therefore, the durations of at least some of the read voltages may be smaller than the duration T. The read duration of the memory cells to be read is equal to a sum of read durations of all pages of the memory cells to be read. It may be understood that, in the examples of the present disclosure, the duration of the corresponding read voltage may be determined according to the voltage difference between the read voltage and the initial voltage, such that the durations of at least some of the read voltages that are subsequently applied on the selected word line are shortened, so that an overall read duration of the memory cells to be read is shortened, and the read performance of the NAND flash memory cell is effectively improved.

In some examples, the first voltage difference is greater than the second voltage difference, and the first duration is longer than the second duration; or the first voltage difference is smaller than the second voltage difference, and the first duration is shorter than the second duration; or the first voltage difference is equal to the second voltage difference, and the first duration is equal to the second duration.

In some examples, the read operation corresponding to each page of the memory cells to be read comprises a first stage that comprises at least one read step; and the first duration and the second duration are durations required to perform the same read step in read operation on different pages, respectively.

In some examples, the first duration and the second duration are durations required to perform the first read step in the read operation on different pages of the memory cells to be read, respectively. The initial voltage in the first duration is equal to the initial voltage in the second duration, a magnitude of the first read voltage is different from a magnitude of the second read voltage, and a length of the first duration is different from a length of the second duration.

In some examples, the first duration and the second duration are durations required to perform an $N^{th}$ read step in the read operation on different pages of the memory cells to be read, respectively; N is an integer greater than 1; and the initial voltage in the first duration is different from the initial voltage in the second duration, the initial voltage in the first duration is equal to a read voltage applied to the first page of the memory cells to be read in an $(N-1)^{th}$ read step, and the initial voltage in the second duration is equal to a read voltage applied to the second page of the memory cells to be read in the $(N-1)^{th}$ read step.

In some examples, the memory controller is further configured to: acquire a third read voltage, and determine a third duration in which the third read voltage is applied to the selected word line to perform a read operation on the first page of the memory cells to be read; and acquire a fourth read voltage, and determine a fourth duration in which the fourth read voltage is applied to the selected word line to perform a read operation on the second page of the memory cells to be read, wherein the first read voltage is smaller than the third read voltage, and the second read voltage is smaller than the fourth read voltage; or the first read voltage is greater than the third read voltage, and the second read voltage is greater than the fourth read voltage.

In some examples, the memory device stores a read voltage table that comprises each read voltage required by the read operation and a duration corresponding to each read voltage. The memory controller is configured to: acquire the read voltages from the read voltage table. The read voltages include the third read voltage and the fourth read voltage.

The initial voltage in the examples of the present disclosure may be a start voltage provided by a read voltage source, or may be also a read voltage in the previous read step.

After the initial voltage is determined, in the memory controller, the above-mentioned third voltage difference and the fourth voltage difference may be obtained through calculation. The third voltage difference may be k3 times of a standard voltage difference (e.g., 1 V), and the third duration may be k3 times of a standard duration corresponding to the standard voltage difference. Similarly, the fourth voltage difference may be k4 times of a standard voltage difference (e.g., 1 V), and the fourth duration may be k4 times of a standard duration corresponding to the standard voltage difference. As such, the third duration may be determined by the third voltage difference, and the fourth duration may be determined by the fourth voltage difference.

In some examples, the memory controller is configured to: determine the third duration and the fourth duration, wherein the third duration is determined based on an absolute value of a voltage difference between the third read voltage and a read voltage required to perform a read operation on the first page of the memory cells to be read in a previous read step, and the fourth duration is determined based on an absolute value of a voltage difference between the fourth read voltage and a read voltage required to perform a read operation on the second page of the memory cells to be read in a previous read step.

In some other examples, the memory controller is configured to: determine the third duration and the fourth duration, wherein both the third duration and the fourth duration are determined based on an absolute value of a voltage difference between the third read voltage and the start voltage provided by the read voltage source.

In some examples, the read operation further comprises a second stage before the first stage and a third stage after the first stage. The memory controller is configured to: at the second stage, determine a first pass voltage required to be applied to a word line coupled with the memory cells to be read, and determine a second pass voltage required to be applied to an unselected word line; and at the third stage, determine a third pass voltage required to be applied to the word line coupled with the memory cells to be read, and determine a fourth pass voltage required to be applied to the unselected word line.

In some examples, the memory controller is further configured to: send a command of performing the read operation separately on each page of the memory cells to be read.

In some examples, the memory device stores a read voltage table that comprises each read voltage required by the read operation and a duration corresponding to each read voltage. The memory controller is configured to: acquire each read voltage and the duration corresponding to each read voltage from the read voltage table.

Examples of the present disclosure further provide an operation method of a memory device. As shown in FIG. 11, the method comprises: S1: applying a first read voltage to a selected word line in a first duration, to perform a read operation on a first page of memory cells to be read; and S2: applying a second read voltage to the selected word line in a second duration, to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In the examples of the present disclosure, the length of each read duration is not a fixed value, but is determined according to the voltage difference (that is, the absolute value of the difference between the read voltage and the initial voltage in the duration). As such, the duration corresponding to each read voltage may be precisely determined. The first read voltage is applied to the selected word line in the first duration, to perform a read operation on the first page of the memory cells to be read; and the second read voltage is applied to the selected word line in the second duration, to perform a read operation on the second page of the memory cells to be read. Therefore, the duration corresponding to each read voltage has varied length. It may be understood, in the examples of the present disclosure, the longest duration may not exceed the duration T in the above examples. Therefore, the durations of at least some of the read voltages may be smaller than the duration T. The read duration of the memory cells to be read is equal to a sum of read durations of all pages of the memory cells to be read. It may be understood that, in the examples of the present disclosure, a duration of a corresponding read voltage may be determined according to the voltage difference between the read voltage and the initial voltage. Therefore, the durations of at least some of the read voltages applied on the selected word line are shortened, such that an overall read duration of the memory cells to be read is shortened, and read performance of the NAND flash memory cell is effectively improved.

In some examples, the method further comprises: applying a third read voltage to the selected word line in a third duration after the first duration, to perform a read operation on the first page of the memory cells to be read; and applying a fourth read voltage to the selected word line in a fourth duration after the second duration, to perform a read operation on the second page of the memory cells to be read, wherein the first read voltage is smaller than the third read voltage, and the second read voltage is smaller than the fourth read voltage; or the first read voltage is greater than the third read voltage, and the second read voltage is greater than the fourth read voltage.

In some examples, the method further comprises: acquiring the third read voltage and the fourth read voltage; and determining the third duration and the fourth duration, wherein the third duration is determined based on an absolute value of a voltage difference between the third read voltage and a read voltage required to perform a read operation on the first page of the memory cells to be read in a previous read step, and the fourth duration is determined based on an absolute value of a voltage difference between the fourth read voltage and a read voltage required to perform a read operation on the second page of the memory cells to be read in a previous read step.

In some examples, the method further comprises: receiving a command of performing the read operation separately on each page of the memory cells to be read; acquiring the first read voltage and the second read voltage; and determining the first duration according to the first voltage difference, and determining the second duration according to the second voltage difference.

In some examples, the read operation corresponding to each page of the memory cells to be read comprises a first stage. The first stage comprises at least one read step. The read operation further comprises a second stage before the first stage and a third stage after the first stage. The method further comprises: at the second stage, applying a first pass voltage to a word line coupled with the memory cells to be read, and applying a second pass voltage to an unselected word line; and at the third stage, applying a third pass voltage to a word line coupled with the memory cells to be read, and applying a fourth pass voltage to the unselected word line.

Examples of the present disclosure further provide an operation method of a memory system. As shown in FIG. 12, the method comprises: S3: acquiring a first read voltage, and determining a first duration in which the first read voltage is applied to a selected word line to perform a read operation on a first page of memory cells to be read; S4: acquiring a second read voltage, and determining a second duration in which the second read voltage is applied to the selected word line to perform a read operation on a second page of the memory cells to be read, wherein a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

In the examples of the present disclosure, the length of each read duration is not a fixed value, but is determined according to the voltage difference (that is, the absolute value of the difference between the read voltage and the initial voltage in the duration). As such, the duration corresponding to each read voltage may be determined precisely, such that the duration corresponding to each read voltage has varied length. It may be understood, in the examples of the present disclosure, the longest duration may not exceed the duration T in the above examples. Therefore, the durations of at least some of the read voltages may be smaller than the duration T. The read duration of the memory cells to be read is equal to a sum of read durations of all pages of the memory cells to be read. It may be understood that, in the examples of the present disclosure, the duration of the corresponding read voltage may be determined according to the voltage difference between the read voltage and the initial voltage, such that the durations of at least some of the read voltages that are subsequently applied on the selected word line are shortened, so that an overall read duration of the memory cells to be read is shortened, and the read performance of the NAND flash memory cell is effectively improved.

The specific implementation of the method in the above examples has been described in detail in the product examples corresponding to the method, and will be no longer set forth in detail here.

It is to be understood that "one example" and "an example" mentioned throughout the specification mean that specific features, structures or characteristics related to the example are included in at least one example of the present disclosure. Therefore, "in one example" or "in an example" presented throughout this specification does not necessarily refer to the same example. In addition, these specific features, structures or characteristics may be combined in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are used for description only, and do not represent advantages or disadvantages of the examples.

It is to be noted that, the terms "include", "comprise", or any variants thereof herein are intended to cover non-exclusive inclusion, such that a process, a method, an article, or a device comprising a series of elements comprise not only those elements, but also other elements not listed explicitly, or elements inherent to this process, method, article, or device. Without further limitation, an element defined by a phrase "comprising one . . . " do not preclude the presence of another identical element in the process, method, article or device comprising this element.

The above descriptions are merely implementations of the present disclosure, and the protection scope of the present disclosure is not limited thereto. Any variation or replacement that may be readily figured out by those skilled in the art within the technical scope disclosed by the present disclosure shall fall within the protection scope of the present disclosure.

What is claimed is:

1. A memory device, comprising a peripheral circuit and a memory cell array coupled with the peripheral circuit, wherein the memory cell array comprises a plurality of groups of memory cells, and one of the plurality of groups of memory cells is correspondingly coupled with one word line; and the peripheral circuit is configured to:
apply a first read voltage to a selected word line in a first duration, to perform a read operation on a first page of memory cells to be read; and
apply a second read voltage to the selected word line in a second duration, to perform a read operation on a second page of the memory cells to be read, wherein
a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

2. The memory device of claim 1, wherein
the first voltage difference is greater than the second voltage difference, and the first duration is longer than the second duration; or
the first voltage difference is smaller than the second voltage difference, and the first duration is shorter than the second duration; or
the first voltage difference is equal to the second voltage difference, and the first duration is equal to the second duration.

3. The memory device of claim 1, wherein the read operation corresponding to each page of the memory cells to be read comprises a first stage, and the first stage comprises at least one read step; and the first duration and the second duration are durations required to perform the same read step in the read operation on different pages, respectively.

4. The memory device of claim 3, wherein the first duration and the second duration are durations required to perform a first read step in the read operation on different pages of the memory cells to be read, respectively; and the initial voltage in the first duration is equal to the initial voltage in the second duration, a magnitude of the first read voltage is different from a magnitude of the second read voltage, and a length of the first duration is different from a length of the second duration.

5. The memory device of claim 3, wherein the first duration and the second duration are durations required to perform an $N^{th}$ read step in the read operation on different pages of the memory cells to be read, respectively; N is an integer greater than 1; and the initial voltage in the first duration is different from the initial voltage in the second duration, the initial voltage in the first duration is equal to a read voltage applied to the first page of the memory cells to be read in an $(N-1)^{th}$ read step, and the initial voltage in the second duration is equal to a read voltage applied to the second page of the memory cells to be read in the $(N-1)^{th}$ read step.

6. The memory device of claim 3, wherein the read operation further comprises a second stage before the first stage and a third stage after the first stage, and the peripheral circuit is configured to:
at the second stage, apply a first pass voltage to a word line coupled with the memory cells to be read, and apply a second pass voltage to an unselected word line; and
at the third stage, apply a third pass voltage to a word line coupled with the memory cells to be read, and apply a fourth pass voltage to an unselected word line.

7. The memory device of claim 1, wherein the peripheral circuit is further configured to:
apply a third read voltage to the selected word line in a third duration after the first duration, to perform a read operation on the first page of the memory cells to be read; and
apply a fourth read voltage to the selected word line in a fourth duration after the second duration, to perform a read operation on the second page of the memory cells to be read, wherein
the first read voltage is smaller than the third read voltage, and the second read voltage is smaller than the fourth read voltage; or
the first read voltage is greater than the third read voltage, and the second read voltage is greater than the fourth read voltage.

8. The memory device of claim 7, wherein the peripheral circuit is further configured to:
acquire the third read voltage and the fourth read voltage; and
determine the third duration and the fourth duration, wherein the third duration is determined based on an absolute value of a voltage difference between the third read voltage and a read voltage required to perform a read operation on the first page of the memory cells to be read in a previous read step, and the fourth duration is determined based on an absolute value of a voltage difference between the fourth read voltage and a read voltage required to perform a read operation on the second page of the memory cells to be read in a previous read step.

9. The memory device of claim 1, wherein the first duration and the second duration both comprise a setup time of read voltage and a sensing time of read voltage, wherein the sensing time of read voltage in the first duration is equal to the sensing time of read voltage in the second duration, and a relationship of magnitude between the setup time of read voltage in the first duration and the setup time of read voltage in the second duration is related to a relationship of magnitude between the first voltage difference and the second voltage difference.

10. The memory device of claim 1, wherein the peripheral circuit is further configured to:
   receive a command of performing the read operation separately on each page of the memory cells to be read;
   acquire the first read voltage and the second read voltage; and
   determine the first duration according to the first voltage difference, and determine the second duration according to the second voltage difference.

11. The memory device of claim 1, wherein the memory device stores a read voltage table that comprises each read voltage required by the read operation and a duration corresponding to each read voltage; and the peripheral circuit is configured to:
   acquire each read voltage and the duration corresponding to each read voltage from the read voltage table, to perform the read operation on each page of the memory cells to be read.

12. A memory system, comprising a memory device and a memory controller coupled with the memory device, wherein the memory device comprises a memory cell array; the memory cell array comprises a plurality of groups of memory cells, and one of the plurality of groups of memory cells is correspondingly coupled with one word line; and the memory controller is configured to:
   acquire a first read voltage, and determine a first duration in which the first read voltage is applied to a selected word line to perform a read operation on a first page of memory cells to be read; and
   acquire a second read voltage, and determine a second duration in which the second read voltage is applied to the selected word line to perform a read operation on a second page of the memory cells to be read, wherein
   a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

13. The memory system of claim 12, wherein
   the first voltage difference is greater than the second voltage difference, and the first duration is longer than the second duration; or
   the first voltage difference is smaller than the second voltage difference, and the first duration is shorter than the second duration; or
   the first voltage difference is equal to the second voltage difference, and the first duration is equal to the second duration.

14. The memory system of claim 12, wherein the read operation corresponding to each page of the memory cells to be read comprises a first stage, and the first stage comprises at least one read step; and the first duration and the second duration are durations required to perform the same read step in the read operation on different pages, respectively.

15. The memory system of claim 14, wherein the first duration and the second duration are durations required to perform a first read step in the read operation on different pages of the memory cells to be read, respectively; and the initial voltage in the first duration is equal to the initial voltage in the second duration, a magnitude of the first read voltage is different from a magnitude of the second read voltage, and a length of the first duration is different from a length of the second duration.

16. The memory system of claim 14, wherein the first duration and the second duration are durations required to perform an $N^{th}$ read step in the read operation on different pages of the memory cells to be read, respectively; N is an integer greater than 1; and the initial voltage in the first duration is different from the initial voltage in the second duration, the initial voltage in the first duration is equal to a read voltage applied to the first page of the memory cells to be read in an $(N-1)^{th}$ read step, and the initial voltage in the second duration is equal to a read voltage applied to the second page of the memory cells to be read in the $(N-1)^{th}$ read step.

17. The memory system of claim 14, wherein the read operation further comprises a second stage before the first stage and a third stage after the first stage, and the memory controller is configured to:
   at the second stage, determine a first pass voltage required to be applied to a word line coupled with the memory cells to be read, and determine a second pass voltage required to be applied to an unselected word line; and
   at the third stage, determine a third pass voltage required to be applied to the word line coupled with the memory cells to be read, and determine a fourth pass voltage required to be applied to the unselected word line.

18. An operation method of a memory device, comprising:
   applying a first read voltage to a selected word line in a first duration, to perform a read operation on a first page of memory cells to be read; and
   applying a second read voltage to the selected word line in a second duration, to perform a read operation on a second page of the memory cells to be read, wherein
   a relationship of length between the first duration and the second duration is related to a relationship of magnitude between a first voltage difference and a second voltage difference, wherein the first voltage difference is an absolute value of a voltage difference between the first read voltage and an initial voltage in the first duration; and the second voltage difference is an absolute value of a voltage difference between the second read voltage and an initial voltage in the second duration.

19. The operation method of claim 18, further comprising:
   applying a third read voltage to the selected word line in a third duration after the first duration, to perform a read operation on the first page of the memory cells to be read; and
   applying a fourth read voltage to the selected word line in a fourth duration after the second duration, to perform a read operation on the second page of the memory cells to be read, wherein
   the first read voltage is smaller than the third read voltage, and the second read voltage is smaller than the fourth read voltage; or
   the first read voltage is greater than the third read voltage, and the second read voltage is greater than the fourth read voltage.

20. The operation method of claim 19, further comprising:
   acquiring the third read voltage and the fourth read voltage; and determining the third duration and the fourth duration, wherein the third duration is determined based on an absolute value of a voltage difference between the third read voltage and a read voltage required to perform a read operation on the first page of the memory cells to be read in a previous read step, and the fourth duration is determined based on an absolute value of a voltage difference between the fourth read voltage and a read voltage required to perform a read operation on the second page of the memory cells to be read in a previous read step.

* * * * *